(12) United States Patent
Chheda et al.

(10) Patent No.: US 9,428,704 B2
(45) Date of Patent: *Aug. 30, 2016

(54) DIRECT AQUEOUS PHASE REFORMING AND ALDOL CONDENSATION TO FORM BIO-BASED FUELS

(75) Inventors: Juben Nemchand Chheda, Houston, TX (US); Lorna Beatriz Ortiz-Soto, Katy, TX (US); Joseph Broun Powell, Houston, TX (US)

(73) Assignee: Shell Oil Company, Houston, TX (US)

( * ) Notice: Subject to any disclaimer, the term of this patent is extended or adjusted under 35 U.S.C. 154(b) by 1082 days.

This patent is subject to a terminal disclaimer.

(21) Appl. No.: 13/106,528

(22) Filed: May 12, 2011

(65) Prior Publication Data

US 2011/0277375 A1    Nov. 17, 2011

Related U.S. Application Data

(60) Provisional application No. 61/333,923, filed on May 12, 2010.

(51) Int. Cl.
*C10L 1/00* (2006.01)
*C10L 1/08* (2006.01)
(Continued)

(52) U.S. Cl.
CPC . *C10L 1/08* (2013.01); *C10G 3/42* (2013.01); *C10G 3/44* (2013.01); *C10G 3/50* (2013.01);
(Continued)

(58) Field of Classification Search
CPC ............ C10G 3/00; C10G 3/42; C10G 3/44; C10G 3/50; C10G 2400/1011; C10G 2400/1014; C10G 2400/1018; C10G 2300/1011; C10G 2300/1014; C10G 2300/1018; C10G 2300/44; C10G 2300/4081; C10G 2400/04; C10G 2400/08; C10L 1/04; C10L 1/08; Y02P 30/20
USPC ....... 585/301, 302, 303, 304, 251, 254, 353, 585/361, 14, 240–242, 314, 315; 44/307
See application file for complete search history.

(56) References Cited

U.S. PATENT DOCUMENTS 3,965,199 A    6/1976  Wright
3,982,722 A    9/1976  Bernard
(Continued)

FOREIGN PATENT DOCUMENTS

WO   WO 2003045841    6/2003
WO   WO 2006119357    11/2006
(Continued)

OTHER PUBLICATIONS

Valenzuela et al., Batch Aqueous-Phase Reforming of Woody Biomass, 20 Energy & Fuels 1744 (Jun. 2006).*
(Continued)

*Primary Examiner* — Prem C Singh
*Assistant Examiner* — Brandi M Doyle

(57) ABSTRACT

A method comprises providing a bio-based feedstock; contacting the bio-based feedstock with a solvent in a hydrolysis reaction to form an intermediate stream comprising carbohydrates; contacting the intermediate stream with an aqueous phase reforming catalyst to form a plurality of oxygenated intermediates, wherein a first portion of the oxygenated intermediates are recycled to form the solvent; and contacting at least a second portion of the oxygenated intermediates with a condensation catalyst comprising a base functionality to form a fuel blend.

24 Claims, 1 Drawing Sheet

(51) Int. Cl.
*C10G 3/00* (2006.01)
*C10L 1/04* (2006.01)

(52) U.S. Cl.
CPC ......... *C10L 1/04* (2013.01); *C10G 2300/1014* (2013.01); *C10G 2300/1018* (2013.01); *C10G 2300/4081* (2013.01); *C10G 2300/44* (2013.01); *C10G 2400/04* (2013.01); *C10G 2400/08* (2013.01); *Y02P 30/20* (2015.11)

(56) References Cited

U.S. PATENT DOCUMENTS

| | | | |
|---|---|---|---|
| 4,013,734 A | 3/1977 | Kim | |
| 4,223,001 A | 9/1980 | Novotny et al. | |
| 4,380,679 A | 4/1983 | Arena | |
| 4,380,680 A | 4/1983 | Arena | |
| 4,382,150 A | 5/1983 | Arena | |
| 4,401,823 A | 8/1983 | Arena | |
| 4,456,779 A | 6/1984 | Owen et al. | |
| 4,476,331 A | 10/1984 | Dubeck et al. | |
| 4,487,980 A | 12/1984 | Arena | |
| 4,503,274 A | 3/1985 | Arena | |
| 4,541,836 A | 9/1985 | Derderian | |
| 4,543,435 A | 9/1985 | Gould et al. | |
| 4,554,260 A | 11/1985 | Pieters et al. | |
| 4,670,613 A | 6/1987 | Ruyter et al. | |
| 4,717,465 A | 1/1988 | Chen et al. | |
| 4,828,812 A | 5/1989 | McCullen et al. | |
| 4,885,421 A | 12/1989 | Harandi et al. | |
| 4,919,896 A | 4/1990 | Harandi et al. | |
| 4,935,568 A | 6/1990 | Harandi et al. | |
| 5,001,292 A | 3/1991 | Harandi et al. | |
| 5,019,135 A | 5/1991 | Sealock, Jr. et al. | |
| 5,095,159 A | 3/1992 | Harandi et al. | |
| 5,105,044 A | 4/1992 | Han et al. | |
| 5,130,101 A | 7/1992 | Harandi et al. | |
| 5,139,002 A | 8/1992 | Lynch et al. | |
| 5,177,279 A | 1/1993 | Harandi | |
| 5,180,868 A | 1/1993 | Baker et al. | |
| 5,238,898 A | 8/1993 | Han et al. | |
| 5,344,849 A | 9/1994 | Ayasse | |
| 5,578,647 A | 11/1996 | Li et al. | |
| 5,616,154 A | 4/1997 | Elliott et al. | |
| 5,651,953 A | 7/1997 | Yokoyama et al. | |
| 5,660,602 A | 8/1997 | Collier, Jr. et al. | |
| 5,666,923 A | 9/1997 | Collier, Jr. et al. | |
| 5,701,025 A | 12/1997 | Yoshimori | |
| 5,787,863 A | 8/1998 | Henig et al. | |
| 5,837,506 A | 11/1998 | Lynd et al. | |
| 5,861,137 A | 1/1999 | Edlund | |
| 5,879,463 A * | 3/1999 | Proenca ........................ 127/37 |
| 5,959,167 A | 9/1999 | Shabtai et al. | |
| 6,022,419 A | 2/2000 | Torget et al. | |
| 6,043,392 A | 3/2000 | Holtzapple et al. | |
| 6,054,041 A | 4/2000 | Ellis et al. | |
| 6,059,995 A | 5/2000 | Topsoe et al. | |
| 6,090,595 A | 7/2000 | Foody et al. | |
| 6,152,975 A | 11/2000 | Elliott et al. | |
| 6,171,992 B1 | 1/2001 | Autenrieth et al. | |
| 6,172,272 B1 | 1/2001 | Shabtai et al. | |
| 6,207,132 B1 | 3/2001 | Lin et al. | |
| 6,235,797 B1 | 5/2001 | Elliot et al. | |
| 6,280,701 B1 | 8/2001 | Autenrieth et al. | |
| 6,291,725 B1 | 9/2001 | Chopade et al. | |
| 6,323,383 B1 | 11/2001 | Tsuchida et al. | |
| 6,361,757 B1 | 3/2002 | Shikada et al. | |
| 6,372,680 B1 | 4/2002 | Wu et al. | |
| 6,387,554 B1 | 5/2002 | Verykios | |
| 6,397,790 B1 | 6/2002 | Collier, Jr. | |
| 6,413,449 B1 | 7/2002 | Wieland et al. | |
| 6,440,895 B1 | 8/2002 | Tonkovich et al. | |
| 6,479,428 B1 | 11/2002 | Tonkovich et al. | |
| 6,479,713 B1 | 11/2002 | Werpy et al. | |
| 6,486,366 B1 | 11/2002 | Ostgard et al. | |
| 6,508,209 B1 | 1/2003 | Collier, Jr. | |
| 6,570,043 B2 | 5/2003 | Elliott et al. | |
| 6,607,707 B2 | 8/2003 | Reichman et al. | |
| 6,670,300 B2 | 12/2003 | Werpy et al. | |
| 6,677,385 B2 | 1/2004 | Werpy et al. | |
| 6,699,457 B2 | 3/2004 | Cortright et al. | |
| 6,739,125 B1 | 5/2004 | Mulligan | |
| 6,749,828 B1 | 6/2004 | Fukunaga | |
| 6,762,149 B2 | 7/2004 | Tonkovich et al. | |
| 6,765,101 B1 | 7/2004 | Bhasin et al. | |
| 6,841,085 B2 | 1/2005 | Werpy et al. | |
| 6,953,873 B2 | 10/2005 | Cortright et al. | |
| 6,964,757 B2 | 11/2005 | Cortright et al. | |
| 6,964,758 B2 | 11/2005 | Cortright et al. | |
| 6,969,506 B2 | 11/2005 | Tonkovich et al. | |
| 7,022,824 B2 | 4/2006 | Vanoppen et al. | |
| 7,038,094 B2 | 5/2006 | Werpy et al. | |
| 7,186,668 B2 | 3/2007 | Werpy et al. | |
| 7,199,250 B2 | 4/2007 | Werpy et al. | |
| 7,273,957 B2 | 9/2007 | Bakshi et al. | |
| 7,288,685 B2 | 10/2007 | Marker | |
| 7,931,784 B2 | 4/2011 | Medoff | |
| 7,972,587 B2 | 7/2011 | Jones et al. | |
| 2002/0020107 A1 | 2/2002 | Bailey et al. | |
| 2003/0099593 A1 | 5/2003 | Cortright et al. | |
| 2003/0100807 A1 | 5/2003 | Shabtai et al. | |
| 2003/0115792 A1 | 6/2003 | Shabtai et al. | |
| 2003/0167679 A1 | 9/2003 | Jordan | |
| 2005/0065337 A1 | 3/2005 | Werpy et al. | |
| 2005/0203195 A1 | 9/2005 | Wang et al. | |
| 2005/0207971 A1 | 9/2005 | Cortright et al. | |
| 2005/0244329 A1 | 11/2005 | Casanave et al. | |
| 2005/0271579 A1 | 12/2005 | Rogers | |
| 2006/0013759 A1 | 1/2006 | Jiang et al. | |
| 2007/0142633 A1 | 6/2007 | Yao et al. | |
| 2007/0173643 A1 | 7/2007 | Werpy et al. | |
| 2007/0173651 A1 | 7/2007 | Holladay et al. | |
| 2007/0173652 A1 | 7/2007 | Holladay et al. | |
| 2007/0173654 A1 | 7/2007 | Holladay et al. ............. 549/463 |
| 2008/0216391 A1* | 9/2008 | Cortright et al. ............... 44/307 |
| 2008/0300434 A1 | 12/2008 | Cortright et al. | |
| 2008/0300435 A1 | 12/2008 | Cortright et al. | |
| 2008/0302001 A1 | 12/2008 | Koivusalmi et al. | |
| 2009/0113787 A1 | 5/2009 | Elliott et al. | |
| 2009/0124839 A1 | 5/2009 | Dumesic et al. | |
| 2009/0255171 A1 | 10/2009 | Dumesic et al. | |
| 2010/0076233 A1 | 3/2010 | Cortright et al. | |
| 2010/0218417 A1 | 9/2010 | Bauldreay et al. | |

FOREIGN PATENT DOCUMENTS

| WO | WO 2007075370 | 7/2007 |
|---|---|---|
| WO | WO 2007075476 | 7/2007 |
| WO | WO 2007103858 | 9/2007 |
| WO | WO 2008109877 | 9/2008 |

OTHER PUBLICATIONS

Vanessa Lehr, et al., "Catalytic Dehydration of Biomass-Derived Polyols in Sub- and Supercritical Water," Catalysis Today, vol. 121, Jan. 10, 2007, pp. 121-129, XP000002657219.

Kottapalli K. Rao, et al., "Activation of Mg/Al Hydrotalcite Catalysts for Aldol Condensation Reactions," Journal of Catalysis, vol. 173, CA971878, Dec. 31, 1997, pp. 115-121, XP000002657220.

Juben N. Chheda, et al. "An Overview of Dehydration, Aldol-Condensation and Hydrogenation Processes for Production of Liquid Alkanes from Biomass-Derived Carbohydrates," Catalysis Today, vol. 123, Jan. 7, 2007, pp. 59-70, XP000002657221.

Anderson Ferreira da Cunha, et al., "Industrail Potential of Yeast Biotechnology in the Production of Bioethanol in Brazil: the Example of Conditional Flocculation," Chapter 4 in "Industrial Perspectives for Bioethanol," Dec. 31, 2006, pp. 59-75, XP000002657381.

Antonio Rodriguez-Chong. et al., "Hydrolysis of Sugar Cande Bagasse Using Nitric Acid: A Kinetic Assessment," Journal of Food Engineering, vol. 61, Dec. 31, 2004, pp. 143-152, XP000002657382.

(56) References Cited

OTHER PUBLICATIONS

Edward L. Kunkes et al., "Catalytic Conversion of Biomass to Monofunctional Hydrocarbons and Targeted Liquid-Fuel Classes," Science, vol. 322, Oct. 17, 2008, pp. 417-421.

Davda, R.R. et al., "A Review of Catalystic Issues and Process Conditions for Renewable Hydrogen and Alkanes by Aqueous-Phase Reforming of Oxygenated Hydrocarbons Over Supported Metal Catalysts," Applied Catalysis, B:Environmental, p. 1-16 (2004).

Davda, R.R., et al., "Catalytic Reforming of Oxygenated Hydrocarbons for Hydrogen with Low Levels of Carbon Monoxide," Angewandte Chemie International 42: 4068-4071 (2003).

Huber, G.W. et al., "Production of Liquid Alkanes by Aqueous-Phase Processing of Biomass-Derived Carbohydrates," Science 308: 1446-1450 (2005).

Huber, G.W., et al., "Renewable Alkanes by Aqueous-Phase Reforming of Biomass-Derived Oxygenates," Angewandte Chemie International 43: 1549-1551 (2004).

Shabaker, J.W., et al., "Aqueous-Phase Reforming of Ethylene Glycol Over Supported Platinum Catalysts," Catalysis Letters 88:1-8 (2003).

Shabaker, J.W., et al., "Sn-modified Ni Catalysts for Aqueous-Phase Reforming: Characterization and Deactivation Studies," Journal of Catalysis 231:67-76 (2005).

Badger, P.C., "Ethanol From Cellulose: A General Review," Ethanol From Cellulose: A General Review p. 17-21 (2002).

Bardin, B.B., et al., "Acidity of Keggin-Type Heteropolycompounds Evaluated by Catalytic Probe Reactions, Sorption Microcalorimetry, and Density Functional Quantum Chemical Calculations," J. Phys. Chem. B 102-10817-10825 (1998).

Barrett, C.J., et al., "Single-Reactor Process for Sequential Aldol-Condensation and Hydrogenation of Biomass-Derived Compounds in Water," Applied Catalysis B: Environmental 66:111-118 (2006).

Brown, N.F., et al., "Carbon-Halogen Bond Scission and Rearrangement of Beta-Halohydrins on the Rh(111) Surface," J. Phys. Chem. 98:12737-12745 (1994).

Chen, N.Y., et al., "Liquid Fuel From Carbohydrates," Chemtech Aug. 1986 p. 506-509.

Chiu, C.W., et al., "Distribution of Methanol and Catalysts Between Biodiesel and Glycerin Phases," AIChE Journal 51:1274-1278 (2005).

Corma, A., et al., "Processing Biomass-Derived Oxygenates in the Oil Refinery: Catalytic Cracking (FCC) Reaction Pathways and Role of Catalyst," J. of Catalysis 247:307-327 (2007).

Cortright, R.D., et al., "Hydrogen From Catalytic Reforming of Biomass-Derived Hydrocarbons in Liquid Water," Nature 418:964-967 (2002).

Dasari, M.A., et al., "Low-Pressure Hydrogenolysis of Glycerol to Propylene Glycol," Applied Catalysis A: General 281:225-231 (2005).

Dass, D.V., et al., "A Comparative Study of the Conversion of Ethanol and of Ethylene Over the "Mobil" Zeolite Catalyst, H-ZSM-5. An Application of the Benzene Sequestration Test," Can. J. Chem. 67:1732-1734 (1989).

Davda, R.R., et al., "Aqueous-Phase Reforming of Ethylene Glycol on Silica-Supported Metal Catalysts," Applied Catalysis B: Environment 43:13-26 (2003).

Dos Santos, S.M., et al., "Performance of RuSn Catalysts Supported on different Oxides in the Selective Hydrogenation of Dimethyl Adipate," Catalysis Today 107-108:250-257 (2005).

Elliott, D.C., et al., "Chemical Processing in High-Pressure Aqueous Environments. 2. Development of Catalyts for Gasification," Ind. Eng. Chem. Res. 32: 1542-1548 (1993).

Elliott, D.C., et al., "Liquid Fuels by Low-Severity Hydrotreating of Biocrude," Developments in Thermochemical Biomass Conversion 1:611-621 (1996).

Elliott, D.C., et al., "Chemical Processing in High-Pressure Aqueous Environments 6. Demonstration of Catalytic Gasification for Chemical Manufacturing Wastewater Cleanup in Industrial Plants," Ind. Eng. Chem. Res. 38:879-883 (1999).

Fraser, J., "Roadmap for Cellulosic Ethanol Production".

Fukuoka, A., et al., "Catalytic Conversion of Cellulose Into Sugar Alcohols," Angew. Chem. Int. Ed. 5:5161-5163 (2006).

Gayubo, A.G., et al., "Transformation of Oxygenate Components of Biomass Pyrolysis Oil on a HZSM-5 Zeolite. I. Alcohols and Phenols," Ind. Eng. Chem. Res. 43:2610-2618 (2004).

Greer, D., "Creating Cellulosic Ethanol: Spinning Straw Into Fuel," May 2005 eNews Bulletin.

Huber, G.W., et al., "Raney Ni—Sn Catalyst for H2 Production From Biomass-Derived Hydrocarbons," Science 300:2075-2077 (2003).

Huber, G.W., et al., "Synthesis of Transportation Fuels From Biomass: Chemistry, Catalysts, and Engineering," Chem. Rev. 106: 4044-4098 (2006).

Kawai, M., et al., "Production of Hydrogen and Hydrocarbon From Cellulose and Water," Chemistry Letters P. 1185-1188 (1981).

Kluson, P., et al., "Selective Hydrogenation Over Ruthenium Catalysts," Applied Catalysis A: General 128:13-31 (1995).

Makarova, M.A., et al., "Dehydration of n-Butanol on Zeolite H-ZSM-5 and Amorphous Aluminosilicate: Detailed Mechanistic Study and the Effect of Pore Confinement," Journal of Catalysis 149:36-51 (1994).

Minowa, T., et al. "Hydrogen Production From Wet Cellulose by Low Temperature Gasification Using a Reduced Nickel Catalyst," Chemistry Letters p. 937-938 (1995).

Minowa, T., et al., "Hydrogen Production From Cellulose in Hot Compressed Water Using Reduced Nickel Catalyst: Product Distribution at Different Reaction Temperature," J. of Chem. Eng. of Japan 31:488-491 (1998).

Nelson, D.A., et al., "Application of Direct Thermal Liquefaction for the Conversion of Cellulosic Biomass," Ind. Eng. Chem. Prod. Res. Dev. 23:471-475 (1984).

Oregon Cellulose-Ethanol Study, "Appendix B—Overview of Cellulose-Ethanol Production Technology," p. 57-60.

Roman-Leshkov, Y., et al., "Production of Dimethylfuran for Liquid Fuels From Biomass-Derived Carbohydrates," Nature 447:982-986 (2007).

Rostrup-Nielsen, J.R., "Conversion of Hydrocarbons and Alcohols for Fuel Cells," Phys. Chem. Chem. Phys. 3:283-288 (2001).

Shabaker, J.W., et al., "Aqueous-Phase Reforming of Methanol and Ethylene Glycol over Alumina-Supported Platinum Catalysts," Journal of Catalysis 215:344-352 (2003).

Shabaker, J.W., et al., "Aqueous-Phase Reforming of Oxygenated Hydrocarbons Over Sn-Modified Ni Catalysts," Journal of Catalysis 222:180-191 (2004).

Silva, A.M., et al., "Role of Catalyst Preparation on Determining Selective Sites for Hydrogenation of Dimethyl Adipate Over RuSn/Al2O3," J. of Molecular Catalysis A: Chemical 253:62-69 (2006).

Tsuchida, T., et al., "Direct Synthesis of n-Butanol From Ethanol Over Nonstoichiometric Hyroxyapatite," Ind. Eng. Chem. Res. 45:8634-9642 (2006).

Wang, D., et al., "Catalytic Stream Reforming of Biomass-Derived Oxygenates: Acetic Acid and Hydroxyacetaldehyde," Applied Catalysis A: General 143:245-270 (1996).

Werpy, T., et al., "Top Value Added Chemicals From Biomass vol. 1-Results of Screening for Potential Candidates From Sugars and Synthesis Gas." (2004).

Yoshida, T., et al., "Gasification of Cellulose, Xylan, and Lignini Mixtures in Supercritical Water," Ind. Eng. Chem. Res. 40:5469-5474 (2001).

Blommel, P. G. et al., "Production of Conventional Liquid Fuels from Sugars," Aug. 25, 2008, pp. 1-14, Retrieved from the Internet: URL:http://www.Virent.com/BioForming/Virent_Technology_Whitepaper.pdf.

Zhou, J. H. et al., "Carbon nanofiber/graphite-felt composite supported Ru catalysts for hydrogenolysis of sorbitol," Catalysis Today, Elsevier, NL, vol. 147, Sep. 1, 2009, pp. S225-S229.

(56) References Cited

OTHER PUBLICATIONS

Clark, I. T., "Hydrogenolysis of Sorbitol," Industrial and Engineering Chemistry, American Chemical Society, US, vol. 50, No. 8, Jan. 1, 1958, pp. 1125-1126.

Denmark, Scott E. And Beuthner, Gregory L., "Lewis Base Catalysis in Organic Synthesis," Angew Chem. Int. Ed. 2008, 47, pp. 1560-1638.

Tanabe, K., Misono, M., Ono, Y., Hattori, H., "New Solid Acids and Bases," Kodansha/Elsevier, Tokyo/Amsterdam, 1989, pp. 260-267.

Gines, M., Iglesia, E., "Bifunctional Condensation Reactions of Alcohols on Basic Oxides Modified by Copper and Potassium," Journal of Catalysis, 1998, 176, pp. 155-172.

U.S. Appl. No. 12/972,141, filed Dec. 17, 2010, Chhdea et al.

U.S. Appl. No. 12/972,154, filed Dec. 17, 2010, Chheda et al.

U.S. Appl. No. 13/106,509, filed May 12, 2011, Chheda et al.

\* cited by examiner

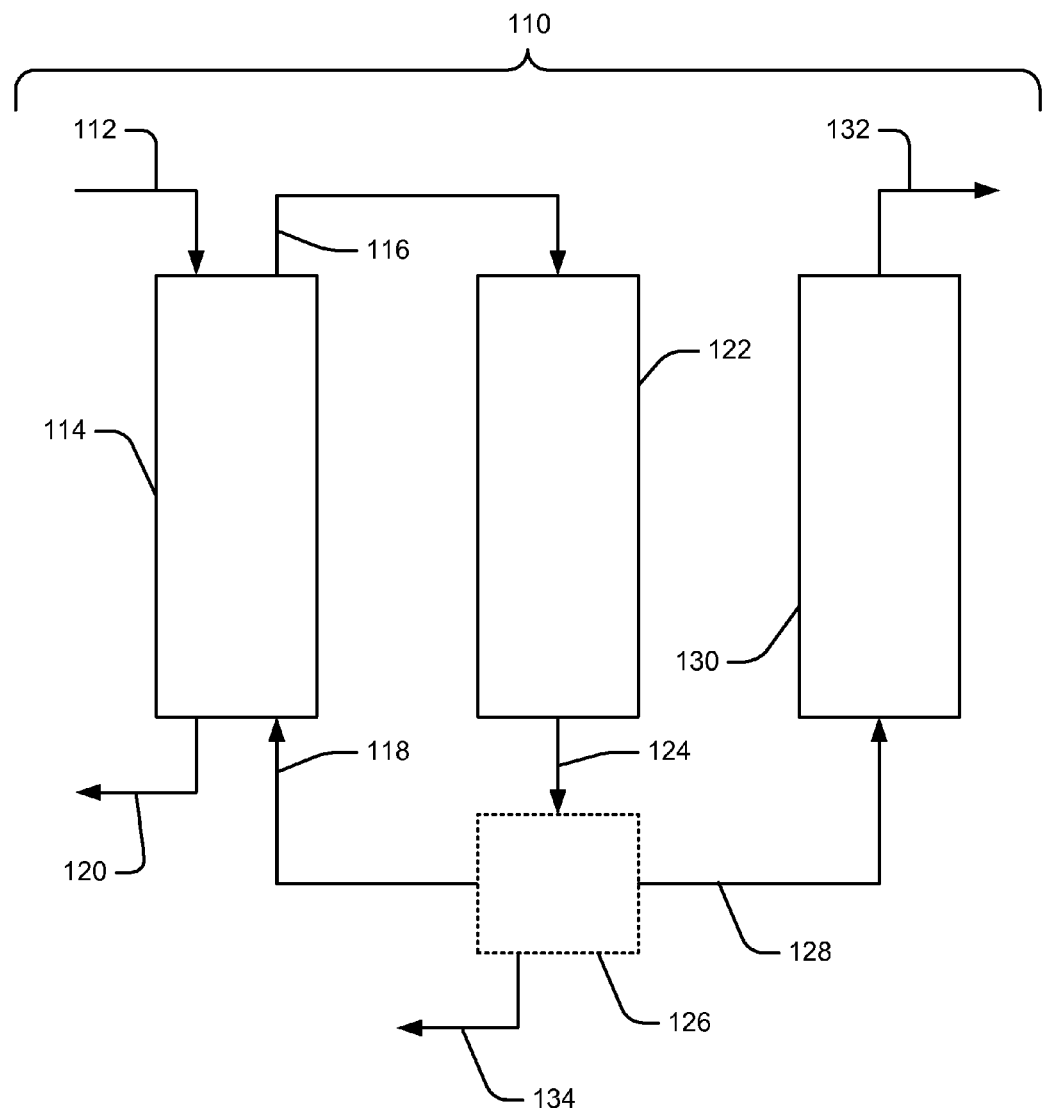

DIRECT AQUEOUS PHASE REFORMING AND ALDOL CONDENSATION TO FORM BIO-BASED FUELS

The present application claims the benefit of U.S. Provisional Patent Application Ser. No. 61/333,923, filed May 12, 2010 the entire disclosure of which is hereby incorporated by reference.

FIELD OF THE INVENTION

The invention relates to the production of higher hydrocarbons suitable for use in transportation fuels and industrial chemicals from bio-based feedstocks.

BACKGROUND OF THE INVENTION

A significant amount of attention has been placed on developing new technologies for providing energy from resources other than fossil fuels. Biomass is a resource that shows promise as a fossil fuel alternative. As opposed to fossil fuel, biomass is also renewable.

Biomass may be useful as a source of renewable fuels. One type of biomass is plant biomass. Plant biomass is the most abundant source of carbohydrate in the world due to the lignocellulosic materials composing the cell walls in higher plants. Plant cell walls are divided into two sections, primary cell walls and secondary cell walls. The primary cell wall provides structure for expanding cells and is composed of three major polysaccharides (cellulose, pectin, and hemicellulose) and one group of glycoproteins. The secondary cell wall, which is produced after the cell has finished growing, also contains polysaccharides and is strengthened through polymeric lignin covalently cross-linked to hemicellulose. Hemicellulose and pectin are typically found in abundance, but cellulose is the predominant polysaccharide and the most abundant source of carbohydrates.

Most transportation vehicles require high power density provided by internal combustion and/or propulsion engines. These engines require clean burning fuels which are generally in liquid form or, to a lesser extent, compressed gases. Liquid fuels are more portable due to their high energy density and their ability to be pumped, which makes handling easier.

Currently, bio-based feedstocks such as biomass provide the only renewable alternative for liquid transportation fuel. Unfortunately, the progress in developing new technologies for producing liquid biofuels has been slow in developing, especially for liquid fuel products that fit within the current infrastructure. Although a variety of fuels can be produced from biomass resources, such as ethanol, methanol, biodiesel, Fischer-Tropsch diesel, and gaseous fuels, such as hydrogen and methane, these fuels require either new distribution technologies and/or combustion technologies appropriate for their characteristics. The production of these fuels also tends to be expensive and raise questions with respect to their net carbon savings.

Carbohydrates are the most abundant, naturally occurring biomolecules. Plant materials store carbohydrates either as sugars, starches, celluloses, lignocelluloses, hemicelluloses, and any combination thereof. In one embodiment, the carbohydrates include monosaccharides, polysaccharides or mixtures of monosaccharides and polysaccharides. As used herein, the term "monosaccharides" refers to hydroxy aldehydes or hydroxy ketones that cannot be hydrolyzed to smaller units. Examples of monosaccharides include, but are not limited to, dextrose, glucose, fructose and galactose. As used herein, the term "polysaccharides" refers to saccharides comprising two or more monosaccharide units. Examples of polysaccharides include, but are not limited to, cellulose, sucrose, maltose, cellobiose, and lactose. Carbohydrates are produced during photosynthesis, a process in which carbon dioxide is converted into organic compounds as a way to store energy. The carbohydrates are highly reactive compounds that can be easily oxidized to generate energy, carbon dioxide, and water. The presence of oxygen in the molecular structure of carbohydrates contributes to the reactivity of the compound. Water soluble carbohydrates react with hydrogen over catalyst(s) to generate polyols and sugar alcohols, either by hydrogenation, hydrogenolysis or both.

U.S. Publication No. 20080216391 to Cortright et al. describes a process for converting carbohydrates to higher hydrocarbons by passing carbohydrates through a hydrogenation reaction followed by an Aqueous Phase Reforming ("APR") process. The hydrogenation reaction produces polyhydric alcohols that can withstand the conditions present in the APR reaction. Further processing in an APR reaction and a condensation reaction can produce a higher hydrocarbon for use as a fuel. Currently APR is limited to feedstocks including sugars or starches, which competes with the use of these materials for food resulting in a limited supply. There is a need to directly process bio-based feedstocks including "biomass", or lignocellulosic feedstocks, into liquid fuels.

SUMMARY OF THE INVENTION

In an embodiment, a method comprises: providing a bio-based feedstock; contacting the bio-based feedstock with a solvent in a hydrolysis reaction to form an intermediate stream comprising carbohydrates; contacting the intermediate stream with an aqueous phase reforming catalyst to form a plurality of oxygenated intermediates, wherein a first portion of the oxygenated intermediates are recycled to form the solvent; and contacting at least a second portion of the oxygenated intermediates with a condensation catalyst comprising a base functionality to form a fuel blend.

In another embodiment, a method comprises: providing a bio-based feedstock; contacting the bio-based feedstock with a hydrolysis catalyst and a solvent to form an intermediate stream comprising carbohydrates; contacting at least a portion of the intermediate stream with a hydrogenolysis catalyst in the presence of a first hydrogen source to form at least some hydrogenolysis reaction products; contacting at least a portion of the intermediate stream with a hydrogenation catalyst in the presence of a second hydrogen source to form at least some hydrogenation reaction products; contacting at least a portion of the intermediate stream with an aqueous phase reforming catalyst to form an aqueous phase reforming reaction product; wherein at least a portion of the hydrogenolysis reaction products, at least a portion of the hydrogenation reaction products, and at a least a portion of the aqueous phase reforming reaction products are combined to form a plurality of oxygenated intermediates, wherein a first portion of the oxygenated intermediates are recycled to form the solvent; and contacting at least a second portion of the oxygenated intermediates with a condensation catalyst comprising a base functionality to form a fuel blend.

In still another embodiment, a system comprises: a hydrolysis reactor operating under hydrolysis conditions that receives a bio-based feedstock and a solvent and discharges an intermediate stream comprising a carbohydrate; an aqueous phase reforming reactor comprising an aqueous phase reforming catalyst that receives the intermediate stream and discharges an oxygenated intermediate stream, wherein a first portion of the oxygenated intermediate stream is recycled to the hydrolysis reactor as the solvent; and a fuels processing reactor comprising a condensation catalyst comprising a base functionality that receives a second portion of the oxygenated intermediate stream and discharges a fuel blend.

The features and advantages of the invention will be apparent to those skilled in the art. While numerous changes may be made by those skilled in the art, such changes are within the spirit of the invention.

BRIEF DESCRIPTION OF THE DRAWING

This drawings illustrates certain aspects of some of the embodiments of the invention, and should not be used to limit or define the invention.

FIG. 1 schematically illustrates a block flow diagram of an embodiment of a higher hydrocarbon production process of this invention.

DETAILED DESCRIPTION OF THE INVENTION

The invention relates to the production of higher hydrocarbons suitable for use in transportation fuels and industrial chemicals from bio-based feedstocks, such as biomass, carbohydrates, which include sugars, sugar alcohols, celluloses, lignocelluloses, hemicelluloses, and any combination thereof. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than the oxygen to carbon ratio of at least one component of the bio-based feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (i.e., oxygen or sulfur) and thus the term "hydrocarbon" may also include substituted hydrocarbons.

The methods and systems of the invention have an advantage of converting a raw bio-based feedstock through hydrolysis and APR reactions to form an oxygenated intermediate stream comprising polyols, alcohols, ketones, aldehydes, and other oxygenated reaction products that can be fed directly to a processing reaction to form higher hydrocarbons, which results in an increased conversion and conversion efficiency and minimizes the formation of unwanted by-products such as carmelins. While not intending to be limited by theory, it is believed that by controlling the concentration of carbohydrates fed to an APR process, degradation of carbohydrate at APR conditions can be minimized. Another advantage is that the invention provides methods that reduce the amount of unwanted byproducts, thereby improving the overall yield of products relative to the carbohydrates extracted from the bio-based feedstock. The invention reduces both the degradation products formed upon extraction of carbohydrates from the biomass and, through subsequent processing in an APR reaction, the amount of coke formed in the processing reactions to form a fuel blend. In some embodiments, oxygenated intermediates produced in the APR reaction are recycled within the process and system to form the in situ generated solvent, which is used in the bio-based feedstock digestion (e.g., hydrolysis) process. This recycle saves costs and can increase the amount of carbohydrates extracted from the bio-based feedstock. Further, by controlling the degradation of carbohydrate in the APR process, the hydrogenation reaction can be conducted along with the APR reaction at temperatures ranging from 250° C. to 375° C. As a result, a separate hydrogenation reaction can be avoided and the fuel forming potential of the bio-based feedstock fed to the process can be increased. This process and reaction scheme described herein also results in a capital cost savings and process operational cost savings. Advantages of specific embodiments will be described in more detail below.

In some embodiments, the invention provides methods comprising: providing a bio-based feedstock, contacting the bio-based feedstock with a solvent in a hydrolysis reaction to form an intermediate stream comprising carbohydrates, contacting the intermediate stream with an APR catalyst to form a plurality of oxygenated intermediates, wherein a first portion of the oxygenated intermediates are recycled to form the solvent; and contacting at least a second portion of the oxygenated intermediates with a catalyst comprising a base functionality to form a fuel blend.

FIG. 1 shows an embodiment of a method of the present invention in which hydrolysis of a bio-based feedstock occurs in hydrolysis reaction 114 to produce an intermediate stream comprising carbohydrates 116, the intermediate stream 116 is fed to an APR reaction 122, and then outlet stream 124 (and optionally 128) are fed to a condensation reaction 130 to produce higher hydrocarbons (stream 132).

In some embodiments, the reactions described below are carried out in any system of suitable design, including systems comprising continuous-flow, batch, semi-batch or multi-system vessels and reactors. One or more reactions may take place in an individual vessel and the process is not limited to separate reaction vessels for each reaction. In some embodiments the system of the invention utilizes a fluidized catalytic bed system. Preferably, the invention is practiced using a continuous-flow system at steady-state equilibrium.

As used herein, the term "bio-based feedstock" means organic materials produced by plants (e.g., leaves, roots, seeds and stalks), and microbial and animal metabolic wastes. Bio-based feedstocks can include biomass. Common sources of biomass include: agricultural wastes (e.g., corn stalks, straw, seed hulls, sugarcane leavings, bagasse, nutshells, and manure from cattle, poultry, and hogs); wood materials (e.g., wood or bark, sawdust, timber slash, and mill scrap); municipal waste (e.g., waste paper and yard clippings); and energy crops (e.g., poplars, willows, switch grass, alfalfa, prairie bluestream, corn, soybean). The term "biomass" also refers to the primary building blocks of all the above, including, but not limited to, saccharides, lignins, celluloses, hemicelluloses, and starches. Bio-based feedstocks can be a source of carbohydrates.

FIG. 1 shows an embodiment of the present invention for converting bio-based feedstocks into fuel products. In this embodiment, a bio-based feedstock 112 is introduced to a hydrolysis reaction 114 along with a recycle stream 118. The recycle stream 118 can comprise a number of components including in situ generated solvents, which may be useful in solvating sugars and lignins from the bio-based feedstock during the hydrolysis reaction. The term "in situ" as used herein refers to a component that is produced within the overall process; it is not limited to a particular reactor for production or use and is therefore synonymous with an in process generated component. The in situ generated solvents may comprise oxygenated intermediates. The hydrolysis reaction may comprise a hydrolysis catalyst (e.g., a metal or acid catalyst) to aid in the hydrolysis reaction. The reaction conditions in the hydrolysis reaction may vary within the reaction media so that a temperature gradient exists within the reaction media, allowing for hemi-cellulose to be extracted at a lower temperature than cellulose. For example, the reaction media may comprise an increasing temperature gradient from the bio-based feedstock 112. The non-extractable solids may be removed from the reaction as an outlet stream 120. The intermediate carbohydrate stream 116 is an intermediate stream that may comprise the hydrolyzed biomass in the form of carbohydrates. The composition of the intermediate carbohydrate stream 116 may vary and may comprise a number of different compounds. Preferably, the carbohydrates have 2 to 12 carbon atoms, and even more preferably 2 to 6 carbon atoms. The carbohydrates may also have an oxygen to carbon ratio from 0.5:1 to 1:1.2.

Various factors affect the conversion of the bio-based feedstock in the hydrolysis reaction. In some embodiments, hemi-cellulose can be extracted from the bio-based feedstock within an aqueous fluid and hydrolyzed at temperatures below 160° C. to produce a C5 carbohydrate fraction. At increasing temperatures, this C5 fraction can be thermally degraded. It is therefore advantageous to convert the C5, C6, or other sugar intermediates directly into more stable intermediates such as sugar alcohols. Even these intermediates can further degrade, such that running the APR reaction to convert them to polyols such as glycerol, ethylene glycol, propylene glycol, and mono-oxygenates is preferred to increase process yields. By recycling the oxygenated intermediates from the APR reaction and performing additional biomass hydrolysis with this recycled liquid, the concentration of active oxygenated intermediates can be increased to commercially viable concentrations without water dilution. Typically, a concentration of at least 2%, or 5% or preferable greater than 8% of a total organic intermediates concentration in water, may be suitable for a viable process. This may be determined by sampling the intermediate stream at the outlet of the hydrolysis reaction and using a suitable technique such as chromatography to identify the concentration of total organics. The oxygenated intermediate stream has a fuel forming potential, as described below.

Cellulose extraction begins above 160° C., with solubilization and hydrolysis becoming complete at temperatures around 190° C., aided by organic acids (e.g., carboxylic acids) formed from partial degradation of carbohydrate components. Some lignins can be solubilized before cellulose, while other lignins may persist to higher temperatures. Organic in situ generated solvents, which may comprise a portion of the oxygenated intermediates, including, but not limited to, light alcohols and polyols, can assist in solubilization and extraction of lignin and other components.

At temperatures ranging from about 217° C. to 277° C., carbohydrates can degrade through a series of complex self-condensation reactions to form caramelans, which are considered degradation products that are difficult to convert to fuel products. In general, some degradation reactions can be expected with aqueous reaction conditions upon application of temperature, given that water will not completely suppress oligomerization and polymerization reactions.

In some embodiments of the invention, the bio-based feedstock is hydrolyzed in a liquid medium such as an aqueous solution to obtain an intermediate carbohydrates stream for use in the process. There are various suitable bio-based feedstock hydrolysis reaction methods, including, but not limited to, acid hydrolysis, alkaline hydrolysis, enzymatic hydrolysis, catalytic hydrolysis, and hydrolysis using hot-compressed water. In certain embodiments, the hydrolysis reaction can occur at a temperature between 100° C. and 250° C. and a pressure between 1 atm and 100 atm. In embodiments including strong acid and enzymatic hydrolysis, the hydrolysis reaction can occur at temperatures as low as ambient temperature and pressure between 1 atm (100 kPa) and 100 atm (10,100 kPa). In some embodiments, the hydrolysis reaction may comprise a hydrolysis catalyst (e.g., a metal or acid catalyst) to aid in the hydrolysis reaction. The catalyst can be any catalyst capable of effecting a hydrolysis reaction. For example, suitable catalysts can include, but are not limited to, acid catalysts, base catalysts, metal catalysts, and any combination thereof. Acid catalysts can include organic acids such as acetic, formic, levulinic acid, and any combination thereof. In an embodiment the acid catalyst may be generated in the APR reaction and comprise a component of the oxygenated intermediate stream.

In some embodiments, the aqueous solution may contain an in situ generated solvent. The in situ generated solvent generally comprises at least one alcohol or polyol capable of solvating one or more hydrolysis reaction products or other components of the bio-based feedstock. For example, an alcohol may be useful for solvating lignin from a biomass feedstock for use within the process. The in situ generated solvent may also include one or more organic acids. In some embodiments, the organic acid can act as a catalyst in the hydrolysis of the bio-based feedstock. Each in situ generated solvent component may be supplied by an external source, generated within the process, and recycled to the hydrolysis reactor, or any combination thereof. For example, a portion of the oxygenated intermediates produced in the APR reaction may be separated in the separator stage for use as the in situ generated solvent in the hydrolysis reaction. In an embodiment, the in situ generated solvent can be separated, stored, and selectively injected into the recycle stream so as to maintain a desired concentration in the recycle stream.

The temperature of the hydrolysis reaction can be chosen so that the maximum amount of extractable carbohydrates are hydrolyzed and extracted as carbohydrates from the bio-based feedstock while limiting the formation of degradation products. In some embodiments, a plurality of reactor vessels may be used to carry out the hydrolysis reaction. These vessels may have any design capable of carrying out a hydrolysis reaction. Suitable reactor vessel designs can include, but are not limited to, co-current, counter-current, stirred tank, or fluidized bed reactors. In this embodiment, the bio-based feedstock may first be introduced into a reactor vessel operating at approximately 157° C. At this temperature the hemicellulose may be hydrolyzed to extract the C5 carbohydrates and some lignin without degrading these products. The remaining bio-based feedstock solids may then exit the first reactor vessel and pass to a second reactor vessel. The second vessel may be operated between 157° C. and 257° C. so that the cellulose is further hydrolyzed to form C6 carbohydrates. The remaining bio-based feedstock solids may then exit the second reactor as a waste stream while the intermediate stream from the second reactor can be cooled and combined with the intermediate stream from the first reactor vessel. The combined outlet stream may then pass to the APR reactor. In another embodiment, a series of reactor vessels may be used with an increasing temperature profile so that a desired carbohydrate fraction is extracted in each vessel. The outlet of each vessel can then be cooled prior to combining the streams, or the streams can be individually fed to the APR reaction for conversion of the intermediate carbohydrate streams to one or more oxygenated intermediate streams.

In another embodiment, the hydrolysis reaction as shown in FIG. 1 may take place in a single vessel. This vessel may have any design capable of carrying out a hydrolysis reaction. Suitable reactor vessel designs can include, but are not limited to, co-current, counter-current, stirred tank, or fluidized bed reactors. In some embodiments, a counter-current reactor design is used in which the biomass flows counter-current to the aqueous stream, which may comprise an in situ generated solvent. In this embodiment, a temperature profile may exist within the reactor vessel so that the temperature within the hydrolysis reaction media at or near the bio-based feedstock inlet is approximately 157° C. and the temperature near the bio-based feedstock outlet is approximately 197° C. to 257° C. The temperature profile may be obtained through the introduction of an aqueous fluid comprising an in situ generated solvent above 197° C. to 257° C. near the bio-based feedstock outlet while simultaneously introducing a bio-based feedstock at 157° C. or below. The specific inlet temperature of the aqueous fluid and the bio-based feedstock will be determined based on a heat balance between the two streams. The resulting temperature profile may be useful for the hydrolysis and extraction of cellulose, lignin, and hemicellulose without the substantial production of degradation products.

Other means may be used to establish an appropriate temperature profile for the hydrolysis reaction and extraction of cellulose and hemicellulose along with other components such as lignin without substantially producing degradation products. For example, internal heat exchange structures may be used within one or more reaction vessels to maintain a desired temperature profile for the hydrolysis reaction. Other structures as would be known to one of ordinary skill in the art may also be used.

Each reactor vessel of the invention preferably includes an inlet and an outlet adapted to remove the product stream from the vessel or reactor. In some embodiments, the vessel in which hydrolysis reaction or some portion of the hydrolysis reaction occurs may include additional outlets to allow for the removal of portions of the reactant stream to help maximize the desired product formation. Suitable reactor designs can include, but are not limited to, a backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester).

The relative composition of the various carbohydrate components in the intermediate carbohydrate stream affects the formation of undesirable by-products such as coke in the APR reaction. In particular, a low concentration of carbohydrates in the intermediate stream can affect the formation of unwanted by-products. In preferred embodiments, it is desirable to have a concentration of no more than 5% of readily degradable carbohydrates or heavy end precursors in the intermediate stream, while maintaining a total organic intermediates concentration, which can include the oxygenated intermediates (e.g., mono-oxygenates, diols, and/or polyols) concentration as high as possible via use of the recycle concept.

In some embodiments of the invention, the carbohydrates in the intermediate carbohydrate stream produced by the hydrolysis reaction are partially de-oxygenated by adding hydrogen or another suitable catalyst to the hydrolysis reactor.

APR converts polyhydric alcohols to carbonyls and/or aldehydes, which react over a catalyst with water to form hydrogen, carbon dioxide, and oxygenated intermediates, which comprise smaller alcohols (e.g., monohydric and/or polyhydric alcohols). The alcohols can further react through a series of deoxygenation reactions to form additional oxygenated intermediates that can produce higher hydrocarbons through a processing reaction such as a condensation reaction.

Referring again to FIG. 1, according to one embodiment, the intermediate carbohydrate stream 116 from the hydrolysis reaction 114 can be passed to an APR reaction to produce oxygenated intermediates. Intermediate carbohydrate stream 116 can comprise C5 and C6 carbohydrates that can be reacted in the APR reaction. For embodiments comprising thermocatalytic APR, oxygenated intermediates such as sugar alcohols, sugar polyols, carboxylic acids, ketones, and/or furans can be converted to fuels in a further processing reaction. The APR reaction can comprise an APR catalyst to aid in the reactions taking place. The APR reaction conditions can be such that an APR reaction can take place along with a hydrogenation reaction, a hydrogenolysis reaction, or both as many of the reaction conditions overlap or are complimentary. The various reactions can result in the formation of one or more oxygenated intermediate streams 124. As used herein, an "oxygenated intermediate" can include one or more polyols, alcohols, ketones, or any other hydrocarbon having at least one oxygen atom.

In some embodiments, the APR catalysts can be a heterogeneous catalyst capable of catalyzing a reaction between hydrogen and carbohydrate, oxygenated intermediate, or both to remove one or more oxygen atoms to produce alcohols and polyols to be fed to the condensation reactor. The APR catalyst can generally include Cu, Re, Ni, Fe, Co, Ru, Pd, Rh, Pt, Os, Ir, Sn, and alloys or any combination thereof, either alone or with promoters such as W, Mo, Au, Ag, Cr, Zn, Mn, B, P, Bi, and alloys or any combination thereof. Other effective APR catalyst materials include either supported nickel or ruthenium modified with rhenium. In some embodiments, the APR catalyst also includes any one of the supports, depending on the desired functionality of the catalyst. The APR catalysts may be prepared by methods known to those of ordinary skill in the art. In some embodiments the APR catalyst includes a supported Group VIII metal catalyst and a metal sponge material (e.g., a sponge nickel catalyst). Raney nickel provides an example of an activated sponge nickel catalyst suitable for use in this invention. In some embodiments, the APR reaction in the invention is performed using a catalyst comprising a nickel-rhenium catalyst or a tungsten-modified nickel catalyst. One example of a suitable catalyst for the APR reaction of the invention is a carbon-supported nickel-rhenium catalyst.

In some embodiments, a suitable Raney nickel catalyst may be prepared by treating an alloy of approximately equal amounts by weight of nickel and aluminum with an aqueous alkali solution, e.g., containing about 25 weight % of sodium hydroxide. The aluminum is selectively dissolved by the aqueous alkali solution resulting in a sponge shaped material comprising mostly nickel with minor amounts of aluminum. The initial alloy includes promoter metals (e.g., molybdenum or chromium) in the amount such that 1 to 2 weight % remains in the formed sponge nickel catalyst. In another embodiment, the APR catalyst is prepared using a solution of ruthenium(III) nitrosylnitrate, ruthenium (III) chloride in water to impregnate a suitable support material. The solution is then dried to form a solid having a water content of less than 1% by weight. The solid is then reduced at atmospheric pressure in a hydrogen stream at 300° C. (uncalcined) or 400° C. (calcined) in a rotary ball furnace for 4 hours. After cooling and rendering the catalyst inert with nitrogen, 5% by volume of oxygen in nitrogen is passed over the catalyst for 2 hours.

In certain embodiments, the APR catalyst may include a catalyst support. The catalyst support stabilizes and supports the catalyst. The type of catalyst support used depends on the chosen catalyst and the reaction conditions. Suitable supports for the invention include, but are not limited to, carbon, silica, silica-alumina, zirconia, titania, ceria, vanadia, nitride, boron nitride, heteropolyacids, hydroxyapatite, zinc oxide, chromia, zeolites, carbon nanotubes, carbon fullerene and any combination thereof.

The conditions for which to carry out the APR reaction will vary based on the type of starting material and the desired products. In general, the APR reaction is conducted at temperatures of 80° C. to 300° C., and preferably at 120° C. to 300° C., and most preferably at 200° C. to 280° C. In some embodiments, the APR reaction is conducted at pressures from 500 kPa to 14000 kPa.

The APR product stream 124 may comprise APR products that include oxygenated intermediates. As used herein, "oxygenated intermediates" generically refers to hydrocarbon compounds having one or more carbon atoms and between one and three oxygen atoms (referred to herein as C1+O1-3 hydrocarbons), such as ketones, aldehydes, furans, hydroxy carboxylic acids, carboxylic acids, alcohols, diols and triols. Preferably, the oxygenated intermediates have from one to six carbon atoms, or two to six carbon atoms, or three to six carbon atoms. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, and isomers thereof. The aldehydes may include, without limitation, hydroxyaldehydes, acetaldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Alcohols may include, without limitation, primary, secondary, linear, branched or cyclic C1+ alcohols, such as methanol, ethanol, n-propyl alcohol, isopropyl alcohol, butyl alcohol, isobutyl alcohol, butanol, pentanol, cyclopentanol, hexanol, cyclohexanol, 2-methyl-cyclopentanonol, heptanol, octanol, nonanol, decanol, undecanol, dodecanol, and isomers thereof. The diols may include, without limitation, ethylene glycol, propylene glycol, 1,3-propanediol, butanediol, pentanediol, hexanediol, heptanediol, octanediol, nonanediol, decanediol, undecanediol, dodecanediol, and isomers thereof. The triols may include, without limitation, glycerol, 1,1,1 tris(hydroxymethyl)-ethane (trimethylolethane), trimethylolpropane, hexanetriol, and isomers thereof. In an embodiment, any alcohols, diols, triols are dehydrogenated in a dehydrogenation reaction to produce a carbonyl useful in an aldol condensation reaction. Furans and furfurals include, without limitation, furan, tetrahydrofuran, dihydrofuran, 2-furan methanol, 2-methyl-tetrahydrofuran, 2,5-dimethyl-tetrahydrofuran, 2-methyl furan, 2-ethyl-tetrahydrofuran, 2-ethyl furan, hydroxylmethylfurfural, 3-hydroxytetrahydrofuran, tetrahydro-3-furanol, 2,5-dimethyl furan, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof.

The oxygenated intermediate stream may generally be characterized as comprising components corresponding to the formula: CnOmHx. In an embodiment, n=1-6 and m=1 to 6, m≤n, and x is an integer that completes the molecular structure (e.g., between 1 and 2n+2). Other elements such as nitrogen or sulfur may also be present in these molecules. Additional components that may be present in the APR products stream can include hydrogen and other gases such as carbon dioxide. These components can be separated from the oxygenated intermediates or they can be fed to the condensation reaction for removal after the condensation reaction.

In a preferred embodiment, hydrogenation and hydrogenolysis take place in the APR reactor because the same catalysts and conditions are applicable to all three reactions. Hydrogenation and hydrogenolysis reactions are discussed in more detail below. These reactions may be optionally employed in the methods of the invention either separate from APR or in conjunction with APR. One of ordinary skill in the art, with the benefit of this disclosure, would know what conditions to choose to maximize the desired product of the hydrogenation, hydrogenolysis, and APR reactions. The inclusion of all three reactions in a single reaction step may have an advantage of process intensification and cost reduction relative to a process in which the three reactions are carried out in separate vessels. Additional process equipment may be present to move the products streams between reactors in specific embodiments. For example, pumps may be used to pass a fluid product stream between reactor vessels when multiple vessels are used.

In some embodiments of the invention, optionally, it is desirable to convert the carbohydrates and oxygenated intermediates from the hydrolysis reaction and APR reaction to smaller molecules. A suitable method for this conversion is through a hydrogenolysis reaction.

Various processes are known for performing hydrogenolysis. One suitable method includes contacting a carbohydrate or oxygenated intermediate with hydrogen or hydrogen mixed with a suitable gas and a hydrogenolysis catalyst in a hydrogenolysis reaction under conditions sufficient to form a reaction product comprising smaller molecules or polyols. As used herein, the term "smaller molecules or polyols" includes any molecule that has a lower molecular weight, which can include a smaller number of carbon atoms or oxygen atoms, than the starting carbohydrate. In some embodiments, the reaction products include smaller molecules that include polyols and alcohols. Someone of ordinary skill in the art would be able to choose the appropriate method by which to carry out the hydrogenolysis reaction.

In some embodiments, a five- and/or six-carbon carbohydrate molecule can be converted to propylene glycol, ethylene glycol, and glycerol using a hydrogenolysis reaction in the presence of a hydrogenolysis catalyst. The hydrogenolysis catalyst may include the same catalysts discussed above relative to the APR catalyst. In certain embodiments, the catalyst described in the hydrogenolysis reaction can include a catalyst support as described above for the APR catalyst.

The conditions for which to carry out the hydrogenolysis reaction will vary based on the type of starting material and the desired products. One of ordinary skill in the art, with the benefit of this disclosure, will recognize the appropriate conditions to use to carry out the reaction. In general, the hydrogenolysis reaction may be conducted at temperatures of 107° C. to 297° C., and preferably at 167° C. to 227° C., and most preferably at 197° C. to 227° C. In some embodiments, the hydrogenolysis reaction is conducted under basic conditions, preferably at a pH of 8 to 13, and even more preferably at a pH of 10 to 12. In some embodiments, the hydrogenolysis reaction is conducted at pressures in a range between 60 kPa and 16500 kPa, and preferably in a range between 1700 kPa and 14000 kPa, and even more preferably between 4800 kPa and 11000 kPa. In certain embodiments, the conditions described in the hydrogenolysis reaction will be the same as described above for the APR and hydrogenation reaction since the reaction can occur in the same reactor.

The carbohydrates, oxygenated intermediates, or both may take place in a hydrogenation reaction to saturate one or more unsaturated bonds. Various processes are suitable for hydrogenating carbohydrates, oxygenated intermediates, or both. One method includes contacting the feed stream with hydrogen or hydrogen mixed with a suitable gas and a catalyst under conditions sufficient to cause a hydrogenation reaction to form a hydrogenated product. In some embodiments, suitable hydrogenation catalysts may be selected from the list of APR catalysts provided above.

The conditions for which to carry out the hydrogenation reaction will vary based on the type of starting material and the desired products. One of ordinary skill in the art, with the benefit of this disclosure, will recognize the appropriate reaction conditions. In general, the hydrogenation reaction is conducted at temperatures of 77° C. to 257° C., and preferably at 87° C. to 227° C., and most preferably at 97° C. to 147° C. In some embodiments, the hydrogenolysis reaction is conducted at pressures from 500 kPa to 14000 kPa. In some embodiments, the conditions of this reaction match those for the APR reaction.

The hydrogen used in the hydrogenation reaction of the current invention can include external hydrogen, recycled hydrogen, in situ generated hydrogen, and any combination thereof. As used herein, the term "external hydrogen" refers to hydrogen that does not originate from a bio-based feedstock reaction itself, but rather is added to the system from another source.

In some embodiments, the APR, the hydrogenation and hydrogenolysis catalysts are the same and may exist in the same bed in the same reactor vessel. Each reactor vessel of the invention preferably includes an inlet and an outlet adapted to remove the product stream from the vessel or reactor. In some embodiments, the vessels and reactors include additional outlets to allow for the removal of portions of the reactant stream to help maximize the desired product formation, and allow for collection and recycling of by-products for use in other portions of the system.

In some embodiments, in the APR reaction, oxygenated intermediates may be produced by catalytically reacting carbohydrates in the presence of an APR catalyst at a reforming temperature and reforming pressure to produce hydrogen, and catalytically reacting the produced hydrogen with a portion of the carbohydrates over a hydrogenation/hydrogenolysis catalyst and deoxygenation pressure and temperature to produce the desired oxygenated intermediates. In certain embodiments, the hydrogen used can be entirely provided by an external source or supplemented by an external source. In another embodiment, the oxygenated intermediates may also include recycled oxygenated intermediates.

Without intending to be limited by theory, the reactions comprising bio-based feedstock conversion via APR can be expressed as:

Biomass (B) hydrolysis→sugar: $r_S = k_{OH} B$ (Eq. 1)

Sugar degradation→heavy ends: $r_S = -k_d S^2$ (Eq. 2)

Sugar (S) hydrogenation to sugar alcohol (A):
$r_S = -k_H w_H P_{H2} S$ (Eq. 3)

Sugar alcohol (A) APR desired products: $r_A = -k_R w_R A$ (Eq. 4)

Oxygenated intermediates, which comprise sugar alcohols, are thought to be more stable under APR reaction conditions than carbohydrates such as sugars, such that higher concentrations of oxygenated intermediates can be tolerated in the reaction mixture without an excessive formation of degradation products. Despite somewhat improved stability for oxygenated intermediates, the residence time of liquid phases at APR temperatures relative to APR catalytic contact time can be minimized in order to decrease yield losses to degradation products. One consideration in the process design is to react the carbohydrates to the desired oxygenated intermediates (Eq. 3), and continue on to the desired reaction products (Eq. 4) as soon as they are formed by hydrolysis (Eq. 1) and before the carbohydrate degradation reaction of Eq. 2 can occur. Another consideration includes the reaction conditions of the carbohydrates involved. The C5 carbohydrates from hemicellulose are extracted at temperatures around 160° C., whereas the C6 carbohydrates are extracted following cellulose hydrolysis at temperatures above 160° C., which could result in the rapid degradation of the C5 carbohydrates. Adding reactions involving formation or consumption of carbohydrate S and solving for the steady state concentration gives:

$$S = \frac{k_{OH} B - k_d S^2}{k_H w_H P_{H2}}$$ (Eq. 5)

while degradation products relative to yield of desired intermediates is given by:

$$\frac{-r_d}{r_H} = \frac{k_d S}{k_H w_H P_{H2}}$$ (Eq. 6)

While only theoretical, Eq. 6 tends to indicate that to reduce yield loss to degradation products, the carbohydrate concentration (i.e., S) should be minimized, and hydrogenation activity should be maximized by, for example, increasing the rate constant $k_H$ by adding more active catalyst, or having a higher $H_2$ partial pressure $P_{H2}$, or increasing the concentration of catalyst present ($w_H$) relative to the residence time in a free liquid for a homogeneous reaction. Eq. 5 teaches that the carbohydrate concentration can be minimized by limiting the hydrolysis rate $k_{OH}$ and maximizing the hydrogenation rate or the APR rate.

The oxygenated intermediate stream 124 may then pass from the APR reaction to an optional separation stage 126, which produces oxygenated intermediate stream 128. In some embodiments, optional separation stage 126 includes elements that allow for the separation of the oxygenated intermediates into different components. In some embodiments of the present invention, the separation stage 126 can receive the oxygenated intermediate stream 124 from the APR reaction and separate the various components into two or more streams. For example, a suitable separator may include, but is not limited to, a phase separator, stripping column, extractor, or distillation column. In some embodiments, a separator is installed prior to a processing reaction to favor production of higher hydrocarbons by separating the higher polyols from the oxygenated intermediates. In such an embodiment, the higher polyols can be recycled back through hydrolysis reactor 114, while the other oxygenated intermediates are passed to the processing reaction. In addition, an outlet stream from the separation stage 118 containing a portion of the oxygenated intermediates may act as in situ generated solvent when recycled to the hydrolysis reactor 114. In one embodiment, the separation stage 126 can also be used to remove some or all of the lignin from the oxygenated intermediate stream. The lignin may be passed out of the separation stage as a separate stream, for example as output stream 134.

In some embodiments, the oxygenated intermediates can be converted into higher hydrocarbons through a processing reaction shown schematically as processing reaction 130 in FIG. 1. In an embodiment, the processing reaction may comprise a condensation reaction to produce a fuel blend. In an embodiment, the higher hydrocarbons may be part of a fuel blend for use as a transportation fuel. In such an embodiment, condensation of the oxygenated intermediates occurs in the presence of a catalyst capable of forming higher hydrocarbons. While not intending to be limited by theory, it is believed that the production of higher hydrocarbons proceeds through a stepwise addition reaction including the formation of carbon-carbon bond. The resulting reaction products include any number of compounds, as described in more detail below.

Referring to FIG. 1, in some embodiments, an outlet stream 128 containing at least a portion of the oxygenated intermediates can pass to a processing reaction or processing reactions. Suitable processing reactions may comprise a variety of catalysts for condensing one or more oxygenated intermediates to higher hydrocarbons. The higher hydrocarbons may comprise a fuel product. The fuel products produced by the processing reactions represent the product stream from the overall process 110 at higher hydrocarbon stream 132. In an embodiment, the oxygen to carbon ratio of the higher hydrocarbons produced through the processing reactions is less than 0.5, alternatively less than 0.4, or preferably less than 0.3.

In the embodiment shown in FIG. 1, the carbohydrates extracted from the bio-based feedstock using a hydrolysis reaction are passed through an APR reactor to form suitable oxygenated intermediates for the condensation reaction in condensation reactor 130.

The oxygenated intermediates can be processed to produce a fuel blend in one or more processing reactions. In an embodiment, a condensation reaction can be used along with other reactions to generate a fuel blend and may be catalyzed by a catalyst comprising basic functional sites. In general, without being limited to any particular theory, it is believed that the basic condensation reactions generally consist of a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a C4+ hydrocarbon; and (7) any combination thereof. Additional polishing reactions may also be used to conform the product to a specific fuel standard. A catalyst comprising a basic functional site, both an acid and a basic functional site, and optionally comprising a metal function, may be used to effect the condensation reaction. In an embodiment, a method of forming a fuel blend from a bio-based feedstock may comprise providing a bio-based feedstock, contacting the bio-based feedstock with a solvent in a hydrolysis reaction to form an intermediate stream comprising carbohydrates, contacting the intermediate stream with an APR catalyst to form a plurality of oxygenated intermediates, wherein a first portion of the oxygenated intermediates are recycled to form the solvent; and contacting at least a second portion of the oxygenated intermediates with a catalyst comprising a base functionality to form a fuel blend. "Acidic" conditions or "acidic functionality" for the catalysts refer to either Bronsted or Lewis acid acidity. For Bronsted acidity, the catalyst is capable of donating protons (designed as $H^+$) to perform the catalytic reaction, under the conditions present in the catalytic reactor. Acidic ion exchange resins, phosphoric acid present as a liquid phase on a support, are two examples. Metal oxides such as silica, silica-aluminas, promoted zirconia or titania can provide protons $H^+$ associated with Bronsted acidiy in the presence of water or water vapor. Lewis acidity entails ability to accept an electron pair, and most typically is obtained via the presence of metal cations in a mixed metal-oxide framework such as silica-alumina or zeolite. Determination of acidic properties can be done via adsorption of a base such as ammonia, use of indictors, or via use of a probe reaction such as dehydration of an alcohol to an olefin, which is acid catalyzed. "Basic" conditions or "base functionality" for the catalysts can refer to either Bronsted or Lewis basicity. For Bronsted basicity, hydroxide anion is supplied by the catalyst, which may be present as an ion exchange resin, or supported liquid phase catalyst, mixed metal oxide with promoter such as alkali, calcium, or magnesium, or in free solution. Lewis base catalysis refers to the conditions where Lewis base catalysis is the process by which an electron pair donor increases the rate of a given chemical reaction by interacting with an acceptor atom in one of the reagents or substrate (see Scott E. Denmark and Gregory L. Beutner, Lewis Base Catalysis in Organic Synthesis, Angew. Chem. Int. Ed. 2008, 47, 1560-1638). Presence and characterization of basic sites for a heterogeneous catalyst may be determined via sorption of an acidic component, use of probe reactions, or use of indicators. (see K. Tanabe, M. Misono, Y. Ono, H. Hattori (Eds.), New Solid Acids and Bases, Kodansha/Elsevier, Tokyo/Amsterdam, 1989, pp. 260-267). Catalysts such as mixed metal oxides may be "amphoteric", or capable of acting as acidic or basic catalysts depending on process conditions (pH, water concentration), or exhibit both acidic and basic properties under specific operating conditions, as a result of surface structures generated during formulation, or in situ during use to effect catalytic reactions In an embodiment, the aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about C8 and C16. Wide-cut or naphtha-type Airplane fuel (including Jet B) typically has a carbon number distribution between about C5 and C15. A fuel blend meeting ASTM D1655 can be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A is used for civilian and military fuels and DCI-6A is used for military fuels. FSII agents, include, e.g., Di-EGME.

In an embodiment, the oxygenated intermediates may comprise a carbonyl-containing compound that can take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream can be dehydrogenated in the presence of a catalyst.

In an embodiment, a dehydrogenation catalyst may be preferred for an oxygenated intermediate stream comprising alcohols, diols, and triols. In general, alcohols cannot participate in aldol condensation directly. The hydroxyl group or groups present can be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation or aqueous phase reforming, which catalysts are described in more detail above. Dehydrogenation yields are enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation, the dehydrogenation and aldol condensation functions can be on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds include, but are not limited to, any compound comprising a carbonyl functional group that can form carbanion species or can react in a condensation reaction with a carbanion species, where "carbonyl" is defined as a carbon atom doubly-bonded to oxygen. In an embodiment, a carbonyl-containing compound can include, but is not limited to, ketones, aldehydes, furfurals, hydroxy carboxylic acids, and, carboxylic acids. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. The aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals include, without limitation, hydroxylmethylfurfural, 5-hydroxymethyl-2 (5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction results in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst can also include a modifier. Suitable modifiers include La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction occurs in the vapor phase. In other embodiments, the dehydration reaction occurs in the liquid phase. For liquid phase dehydration reactions, an aqueous solution may be used to carry out the reaction. In an embodiment, other solvents in addition to water, are used to form the aqueous solution. For example, water soluble organic solvents may be present. Suitable solvents can include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediate stream. For example, an alcohol or other hydroxyl functional group can be converted into a ketone in a ketonization reaction. Ketonization may be carried out in the presence of a base catalyst. Any of the base catalysts described above as the basic component of the aldol condensation reaction can be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction can be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings can be opened in the presence of an acid functionality and reacted in an aldol condensation reaction using a base functionality. Such a concerted reaction scheme may allow for the production of a greater amount of higher hydrocarbons to be formed for a given oxygenated intermediate feed.

In an embodiment, production of a C4+ compound occurs by condensation, which may include aldol-condensation, of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a C9 species, which may subsequently react with another hydroxymethylfurfural molecule to form a C15 species. The reaction is usually carried out in the presence of a condensation catalyst. The condensation reaction may be carried out in the vapor or liquid phase. In an embodiment, the reaction may take place at a temperature in the range of from about 7° C. to about 377° C., depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionality, or either type of catalyst also comprising an optional metal functionality. In an embodiment, the multi-functional catalyst will be a catalyst having both a strong acid and a strong base functionality. In an embodiment, aldol catalysts can comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst can also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises a mixed-oxide base catalysts. Suitable mixed-oxide base catalysts can comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst further includes a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials include Li, Na, K, Cs and Rb. In an embodiment, preferred Group IIA materials include Mg, Ca, Sr and Ba. In an embodiment, Group IIB materials include Zn and Cd. In an embodiment, Group IIIB materials include Y and La. Basic resins include resins that exhibit basic functionality. The base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst is derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the base catalyst is a metal oxide containing Cu, Ni, Zn, V, Zr, or mixtures thereof. In another embodiment, the base catalyst is a zinc aluminate metal containing Pt, Pd Cu, Ni, or mixtures thereof.

Preferred loading of the primary metal in the condensation catalyst is in the range of 0.10 wt % to 25 wt %, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal, if any, is in the range of 0.25-to-1 to 10-to-1, including ratios there between, such as 0.50, 1.00, 2.50, 5.00, and 7.50-to-1.

In some embodiments, the base catalyzed condensation reaction is performed using a condensation catalyst with both an acid and base functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst includes a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst is a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material is present in an amount less than that required to neutralize the acidic nature of the support. A metal function may also be provided by the addition of group VIIIB metals, or Cu, Ga, In, Zn or Sn. In one embodiment, the condensation catalyst is derived from the combination of MgO and $Al_2O_3$ to form a hydrotalcite material. Another preferred material contains a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

If a Group IIB, VIIB, VIIB, VIIIB, IIA or IVA metal is included in the condensation catalyst, the loading of the metal is in the range of 0.10 wt % to 10 wt %, with weight percentages of 0.10% and 0.05% increments between, such as 1.00%, 1.10%, 1.15%, 2.00%, 2.50%, 5.00% and 7.50%, etc. If a second metal is included, the preferred atomic ratio of the second metal is in the range of 0.25-to-1 to 5-to-1, including ratios there between, such as 0.50, 1.00, 2.50 and 5.00-to-1.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes include extrusion, pelletization, oil dropping, or other known processes. Zinc oxide, alumina, and a peptizing agent may also be mixed together and extruded to produce a formed material. After drying, this material is calcined at a temperature appropriate for formation of the catalytically active phase, which usually requires temperatures in excess of 452° C. Other catalyst supports as known to those of ordinary skill in the art may also be used.

In some embodiments, a dehydration catalyst, a dehydrogenation catalyst, and the condensation catalyst can be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys.

Suitable active elements can comprise any of those listed above with respect to the dehydration catalyst, dehydrogenation catalyst, and the condensation catalyst. Alternately, a physical mixture of dehydration, dehydrogenation, and condensation catalysts could be employed. While not intending to be limited by theory, it is believed that using a condensation catalyst comprising a metal and/or an acid functionality may assist in pushing the equilibrium limited aldol condensation reaction towards completion. Advantageously, this can be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific C4+ compounds produced in the condensation reaction will depend on various factors, including, without limitation, the type of oxygenated intermediates in the reactant stream, condensation temperature, condensation pressure, the reactivity of the catalyst, and the flow rate of the reactant stream as it affects the space velocity, GHSV and WHSV. Preferably, the reactant stream is contacted with the condensation catalyst at a WHSV that is appropriate to produce the desired hydrocarbon products. The WHSV is preferably at least about 0.1 grams of oxygenated intermediates in the reactant stream per hour, more preferably the WHSV is between about 0.1 to 40.0 g/g hr, including a WHSV of about 1, 2, 3, 4, 5, 6, 7, 8, 9, 10, 11, 12, 13, 14, 15, 20, 25, 30, 35 g/g hr, and increments between.

In general, the condensation reaction should be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 10 kPa, and the thermodynamics of the reaction are favorable. The condensation temperature will vary depending upon the specific oxygenated intermediates used, but is generally in the range of from about 77° C. to 502° C. for reactions taking place in the vapor phase, and more preferably from about 127° C. to 452° C. For liquid phase reactions, the condensation temperature may be from about 7° C. to 477° C., and the condensation pressure from about 0.1 kPa to 10,000 kPa. Preferably, the condensation temperature is between about 17° C. and 302° C., or between about 17° C. and 252° C. for difficult substrates.

Varying the factors above, as well as others, will generally result in a modification to the specific composition and yields of the C4+ compounds. For example, varying the temperature and/or pressure of the reactor system, or the particular catalyst formulations, may result in the production of C4+ alcohols and/or ketones instead of C4+ hydrocarbons. The C4+ hydrocarbon product may also contain a variety of olefins, and alkanes of various sizes (typically branched alkanes). Depending upon the condensation catalyst used, the hydrocarbon product may also include aromatic and cyclic hydrocarbon compounds. The C4+ hydrocarbon product may also contain undesirably high levels of olefins, which may lead to coking or deposits in combustion engines, or other undesirable hydrocarbon products. In such event, the hydrocarbon molecules produced may be optionally hydrogenated to reduce the ketones to alcohols and hydrocarbons, while the alcohols and unsaturated hydrocarbon may be reduced to alkanes, thereby forming a more desirable hydrocarbon product having low levels of olefins, aromatics or alcohols.

The condensation reactions may be carried out in any reactor of suitable design, including continuous-flow, batch, semi-batch or multi-system reactors, without limitation as to design, size, geometry, flow rates, etc. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system can include an optional dehydrogenation bed adapted to produce dehydrogenated oxygenated intermediates, an optional dehydration bed adapted to produce dehydrated oxygenated intermediates, and a condensation bed to produce C4+ compounds from the oxygenated intermediates. The dehydrogenation bed is configured to receive the reactant stream and produce the desired oxygenated intermediates, which may have an increase in the amount of carbonyl-containing compounds. The de-hydration bed is configured to receive the reactant stream and produce the desired oxygenated intermediates. The condensation bed is configured to receive the oxygenated intermediates for contact with the condensation catalyst and production of the desired C4+ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably includes an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also includes additional outlets to allow for the removal of portions of the reactant stream to further advance or direct the reaction to the desired reaction products, and to allow for the collection and recycling of reaction byproducts for use in other portions of the system. In an embodiment, the reactor system also includes additional inlets to allow for the introduction of supplemental materials to further advance or direct the reaction to the desired reaction products, and to allow for the recycling of reaction byproducts for use in other reactions.

In an embodiment, the reactor system also includes elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit is installed to remove specific intermediates to allow for the production of a desired product stream containing hydrocarbons within a particular carbon number range, or for use as end products or in other systems or processes.

The condensation reaction can produce a broad range of compounds with carbon numbers ranging from C4 to C30 or greater. Exemplary compounds include, but are not limited to, C4+ alkanes, C4+ alkenes, C5+ cycloalkanes, C5+ cycloalkenes, aryls, fused aryls, C4+ alcohols, C4+ ketones, and mixtures thereof. The C4+ alkanes and C4+ alkenes may range from 4 to 30 carbon atoms (C4-C30 alkanes and C4-C30 alkenes) and may be branched or straight chained alkanes or alkenes. The C4+ alkanes and C4+ alkenes may also include fractions of C7-C14, C12-C24 alkanes and alkenes, respectively, with the C7-C14 fraction directed to jet fuel blend, and the C12-C24 fraction directed to a diesel fuel blend and other industrial applications. Examples of various C4+ alkanes and C4+ alkenes include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The C5+ cycloalkanes and C5+ cycloalkenes have from 5 to 30 carbon atoms and may be unsubstituted, mono-substituted or multi-substituted. In the case of mono-substituted and multi-substituted compounds, the substituted group may include a branched C3+ alkyl, a straight chain C1+ alkyl, a branched C3+ alkylene, a straight chain C1+ alkylene, a straight chain C2+ alkylene, a phenyl or a combination thereof. In one embodiment, at least one of the substituted groups include a branched C3-C12 alkyl, a straight chain C1-C12 alkyl, a branched C3-C12 alkylene, a straight chain C1-C12 alkylene, a straight chain C2-C12 alkylene, a phenyl or a combination thereof. In yet another embodiment, at least one of the substituted groups includes a branched C3-C4 alkyl, a straight chain C1-C4 alkyl, a branched C3-C4 alkylene, a straight chain C1-C4 alkylene, a straight chain C2-C4 alkylene, a phenyl, or any combination thereof. Examples of desirable C5+ cycloalkanes and C5+ cycloalkenes include, without limitation, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, and isomers thereof.

Aryls will generally consist of an aromatic hydrocarbon in either an unsubstituted (phenyl), mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In one embodiment, at least one of the substituted groups includes a branched C3-C12 alkyl, a straight chain C1-C12 alkyl, a branched C3-C12 alkylene, a straight chain C2-C12 alkylene, a phenyl, or any combination thereof. In yet another embodiment, at least one of the substituted groups includes a branched C3-C4 alkyl, a straight chain C1-C4 alkyl, a branched C3-C4 alkylene, straight chain C2-C4 alkylene, a phenyl, or any combination thereof. Examples of various aryls include, without limitation, benzene, toluene, xylene (dimethylbenzene), ethyl benzene, para xylene, meta xylene, ortho xylene, C9 aromatics.

Fused aryls will generally consist of bicyclic and polycyclic aromatic hydrocarbons, in either an unsubstituted, mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In another embodiment, at least one of the substituted groups includes a branched C3-C4 alkyl, a straight chain C1-C4 alkyl, a branched C3-C4 alkylene, a straight chain C2-C4 alkylene, a phenyl, or any combination thereof. Examples of various fused aryls include, without limitation, naphthalene, anthracene, tetrahydronaphthalene, and decahydronaphthalene, indane, indene, and isomers thereof.

The moderate fractions, such as C7-C14, may be separated for jet fuel, while heavier fractions, (e.g., C12-C24), may be separated for diesel use. The heaviest fractions may be used as lubricants or cracked to produce additional gasoline and/or diesel fractions. The C4+ compounds may also find use as industrial chemicals, whether as an intermediate or an end product. For example, the aryls toluene, xylene, ethyl benzene, para xylene, meta xylene, ortho xylene may find use as chemical intermediates for the production of plastics and other products. Meanwhile, the C9 aromatics and fused aryls, such as naphthalene, anthracene, tetrahydronaphthalene, and decahydronaphthalene, may find use as solvents in industrial processes.

In an embodiment, additional processes are used to treat the fuel blend to remove certain components or further conform the fuel blend to a diesel or jet fuel standard. Suitable techniques include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation is carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream can be carried out according to known procedures, either with the continuous or batch method. The hydrogenation reaction may be used to remove a remaining carbonyl group or hydroxyl group. In such event, any one of the hydrogenation catalysts described above may be used. Such catalysts may include any one or more of the following metals, Cu, Ni, Fe, Co, Ru, Pd, Rh, Pt, Ir, Os, alloys or combinations thereof, alone or with promoters such as Au, Ag, Cr, Zn, Mn, Sn, Cu, Bi, and alloys thereof, may be used in various loadings ranging from about 0.01 wt % to about 20 wt % on a support as described above. In general, the finishing step is carried out at finishing temperatures of between about 80° C. to 250° C., and finishing pressures in the range of about 700 kPa to 15,000 kPa. In one embodiment, the finishing step is conducted in the vapor phase or liquid phase, and uses in situ generated $H_2$ (e.g., generated in the APR reaction step), external $H_2$, recycled $H_2$, or combinations thereof, as necessary.

In an embodiment, isomerization is used to treat the fuel blend to introduce a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in a counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 2000 kPa to 15,000 kPa, preferably in the range of 2000 kPa to 10,000 kPa, the temperature being between 197° C. and 502° C., preferably between 302° C. and 402° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired oxygenated intermediates, may also effect the composition and yields of the C4+ compounds, as well as the activity and stability of the condensation catalyst. In such event, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation step so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

In an embodiment of the present invention, the fuel yield of the current process may be greater than other bio-based feedstock conversion processes. Without wishing to be limited by theory, it is believed that the use of a multi-temperature hydrolysis reaction process along with the direct APR of the extracted compounds allows for a greater percentage of the bio-based feedstock to be converted into higher hydrocarbons while limiting the formation of degradation products.

To facilitate a better understanding of the present invention, the following examples of certain aspects of some embodiments are given. In no way should the following examples be read to limit, or define, the entire scope of the invention.

EXAMPLES

Direct aqueous phase reforming (APR) experiments were conducted in 100-ml stirred reactors with draft-tube gas-induction impeller (Parr Series 4590). Reaction tests for direct bio-based feedstock aqueous phase reforming (APR) entailed filling the reactor with 60-grams of solvent (deionized water, or a mixture of DI water and isopropanol (IPA), and 3-3.5 grams of bio-based feedstock comprising biomass (bagasse, or pine sawdust)). One (1) gram of acetic acid was optionally charged to facilitate biomass hydrolysis.

Bagasse was milled via a 1-mm grate. Dry, debarked Loblolly pine was ground via blender (Thomas Scientific of Swedesboro, N.J.) and sieved to less than 30 mesh. Dry solids fraction was determined by vacuum drying at 80° C. to 82° C. One gram of aqueous phase reforming catalyst (reduced 5% Pt/C catalyst at 50% moisture, or powdered 1.9% Pt/Al2O3) was charged to the reactor, which was charged with 4200 kPa of hydrogen or nitrogen. To minimize degradation of hydrolysate to heavy ends, each reactor was typically heated with a staged temperature sequence of one hour at, 160° C., 190° C., 225° C., and finally 250° C., before leaving overnight at the final setpoint.

Comparison tests were also conducted with glucose or sorbitol fed directly to the reaction in place of biomass, to simulate and quantify conversion of model hydrolysate to APR intermediates. Glucose is one of the sugars readily leached from biomass in hot water, while sorbitol is readily formed via hydrogenation of glucose, where platinum or other catalysts capable of hydrogenation are present.

A batch reaction time of 20 hours under these conditions corresponds to a weight hourly space velocity (g-feed/g-catalyst/h) of about 3, for a comparable continuous flow reactor. A 0.5-micron sintered metal filter attached to a dip tube allowed liquid samples to be taken throughout the course of reaction, without loss of biomass or catalyst. Samples were analyzed by an HPLC method based on combined size and ion exclusion chromatography, to determine unreacted sorbitol, and amount of C3 and smaller polyols formed: glycerol (Gly), ethylene glycol (EG), and 1,2-propylene glycol (PG). Additional GC analysis via a moderate polarity DB-5 column were conducted to assess formation of C6 and lighter oxygenates (e.g., ketones, aldehydes, alcohols), as well as alkane and alkene products. A separate GC equipped with thermal conductivity and flame ionization (FID) detectors for refinery gas analysis, were used for detection of $H_2$, $CO_2$, and light alkanes C1-C5. GC-mass spec was used to characterize select APR reaction product mixtures.

Examples 1-3

Batch APR reactions with sugar cane bagasse as biomass feed, and with a comparison of 25% sorbitol as feed, were performed as described above. 1.7% acetic acid was added to simulate catalysis of hydrolysis by recycle acid. Products formed from this concentration of acetic acid were subtracted from total product formation, to calculate the net production of liquid fuels from bagasse.

For Example 1, the yield of liquid fuels products via gas chromatographic analysis (per unit wt % carbon charged) was observed to increase, as temperature was increased stage wise via the sequence 160° C., 190° C., and 225° C. A further increase in temperature with heating overnight led to a slight decrease in yield per carbon fed. Overall yields from bagasse were calculated as 82% of the yield/C obtained with model compound sorbitol as feed (Example 3). This compares favorably with the 77% hydrolysable fraction of dry bagasse, which contains 20% lignin and 3% ash. Results thus indicate that all sugar precursors present in bagasse were hydrolyzed, and selectively converted to liquid biofuel intermediates.

Example 2 examined yields for a similar experiment where hydrolysis by hot water and acetic acid was conducted first, without the concerted presence of Pt/C APR catalyst. While a small yield was obtained following thermal contacting at 225° C. in Example 2A, the yield obtained from acid condensation diminished upon further heating to 250° C., in the absence of catalyst (Example 2B). Pt/C catalyst was then added to the resulting liquid for Example 2C, to effect aqueous phase reforming of hydrolysate from the initial heating step. Yields/C were less than those obtained from the 1.7% acetic acid added as hydrolysis catalyst, when the resulting liquid was analyzed for liquid fuel intermediates and components.

This result shown in Table 1 shows the critical importance of concerted APR reaction with hydrolysis of biomass. In the absence of concerted aqueous phase reforming, the hydrolysate undergoes irreversible degradation (presumably to heavy ends), and cannot be reverted to liquid fuels upon subsequent APR and condensation. Converted reaction may be effected by direct inclusion of APR catalyst in the hydrolysis reactor, or via a pump around loop to recirculate liquid between a biomass contactor, and an APR catalytic reactor.

TABLE 1

Direct APR of Biomass

| Ex # | Feed | % CHO actives | Catalyst | Tmax K | total hours | Liquid fuel Yield/C |
|---|---|---|---|---|---|---|
| 1A | Bagasse | 5.50% | 5% Pt/C | 433 | 1.0 | 0.068 |
| 1B | Bagasse | 5.50% | 5% Pt/C | 463 | 2.0 | 0.601 |
| 1C | Bagasse | 5.50% | 5% Pt/C | 498 | 3.0 | 0.821 |
| 1D | Bagasse | 5.50% | 5% Pt/C | 523 | 21.0 | 0.739 |
| 2A | Bagasse | 5.50% | None | 498 | 2.5 | 0.210 |
| 2B | Bagasse | 5.50% | None | 523 | 21.0 | 0.070 |
| 2C | cycle 2B | 5.50% | 5% Pt/C | 523 | 3.0 | −0.041 |
| 3A | Sorbitol | 25% | 5% Pt/C | 523 | 22.3 | 1.000 |

Mass spec characterization of the intermediates formed from the APR step of Example 3 is shown in Table 2. APR of sugar or sugar alcohol results in a plethora of mono-, di, and tri-oxygenate compounds, including carboxylic acids which cause a drop in pH to about 3.5-4.0. These acids can catalyze hydrolysis of biomass, upon recycle of the reaction mixture.

TABLE 2

Components identified in Aqueous Phase Reforming (APR) of sorbitol [GC-MS]

Propionaldehyde
Acetone
2,5-Dimethyltetrahydrofuran
Tetrahydrofuran + Vinyl formate
2-Methyltetrahydrofuran
Methanol
Isopropyl acetate + 2-Butanone
Tetrahydropyran
Isopropyl Alcohol
Ethanol
2-Pentanone & 3-Pentanone
2-Butanol
n-Propanol
3-Hexanone
2-Hexanone
2-Methylcyclopentanone
3-Hexanol
3-Methylcyclopentanone
2-Hexanol
1-Pentanol
Dihydro-2-methyl-3(2H)-Furanone
3-Hydroxy-2-butanone
2-Methyl-1-pentanol
Ethyl lactate
1-Hexanol TABLE 2-continued Components identified in Aqueous Phase Reforming (APR) of sorbitol [GC-MS]

1-Hydroxy-2-butanone
Acetic acid
2,5-Hexanedione
Propionic acid
2,3-Butanediol + Isobutyric Acid
Propylene glycol
Ethylene glycol
Butyric acid
Valeric acid
Hexanoic acid
Glycerol
Isosorbide
2,5-Dimethyltetrahydrofuran
2,3-Butanediol + Isobutyric Acid Examples 4-12

Table 3 shows direct, concerted biomass APR and hydrogenation experiments with bagasse as feedstock. Acetic acid and isopropanol (IPA) were added to simulate intermediates from bioforming which are known to assist in biomass hydrolysis and solubilization. At the end of these experiments, the reaction mixture was filtered on Whatman #2 filter paper to recover catalyst and undigested bagasse, from which a percent "digested" could be calculated. As used herein, "digested" means soluble enough to pass through a Whatman #2 filter paper after cooling to room temperature.

The minimum "digested" bagasse was 70.9%, and in many cases the digested bagasse approached 100%. Filtered samples were not analyzed for ash content for current experiments. The extent to which acetic acid addition may have solubilized salts as acetate is unknown. Certainly, digestion greater than 70% indicates solubilization of lignin, which was expected where IPA was added as initial solvent. Light alcohols capable of solubilizing lignins were also be generated during APR of sugars or sugar alcohols as shown in Table 2 above.

TABLE 3

Direct Biomass APR or hydrogenation

| Ex # | bagasse wt % | Acetic acid wt % | IPA wt % | Catalyst | wt % catalyst | Gas phase | Tmax deg C. | Time hours | Percent Digest |
|---|---|---|---|---|---|---|---|---|---|
| 4 | 4.8% | 0.0% | 0.0% | 5% Pt/C | 0.72% | H2 | 433 | 125.0 | 70.9% |
| 5 | 4.8% | 2.0% | 50.0% | 5% Pt/C | 0.72% | H2 | 523 | 23.0 | 97.2% |
| 6 | 4.8% | 2.0% | 50.0% | 5% Pt/C | 0.71% | H2 | 523 | 12.0 | 104.6% |
| 7 | 4.8% | 2.0% | 50.0% | 5% Ru/C | 0.71% | H2 | 523 | 8.7 | 102.5% |
| 8 | 4.8% | 2.0% | 0.0% | 5% Ru/C | 0.77% | H2 | 523 | 20.0 | 102.6% |
| 9 | 4.8% | 2.0% | 50.0% | None | 0.00% | H2 | 523 | 5.0 | 88.5% |
| 10 | 5.5% | 1.0% | 0.0% | 5% Pt/C | 0.83% | H2 | 523 | 23.0 | 98.9% |
| 11 | 5.5% | 1.2% | 0.0% | None | 0.00% | N2 | 523 | 20.0 | N/A |
| 11B | 5.5% | 1.2% | 0.0% | +Pt/C & H2 | 0.82% | H2 | 523 | 4.0 | 84.5% |
| 12 | 4.7% | 1.1% | 50.0% | None | 0.00% | N2 | 523 | 8.0 | 95.3% |

Both ruthenium hydrogenation catalyst and platinum APR catalysts were used for concerted biomass hydrolysis and reaction. For ruthenium, the expected pathway is one of hydrogenation of hydrolyzed biomass to form sugar alcohols at temperatures below 200° C., and further hydrogenolysis to form polyols such as ethylene glycol (EG or MEG for "mono"), propylene glycol (PG or MPG), glycerol, or even isosorbide via dehydration. For APR, the reaction products were reformed by platinum to give smaller molecular weight species amenable to condensation to liquid hydrocarbon fuels. Where IPA was added at 50%, solutions remained crystal clear with a yellow color for weeks of storage. Where IPA was not added, solutions would flock and precipitate over a period of time (days). All solutions were sampled via dip tube with 5-micron filter. Addition of IPA, acetic acid, and catalyst generally increased the extent of digestion per unit time. Very high digestion was accomplished via use of catalyst together with acetic acid, or with IPA/acetic combination without catalyst.

Example 13

The 100-ml batch reactor was charged with 28.28 grams of isopropanol (IPA), 28.41 grams of deionized water, 1.018 grams of acetic acid, 0.995 grams of 5% Pt/C APR catalyst, and 3.478 grams of 1 micron milled bagasse at 4.7% moisture. The reactor was heated with mixing to 175° C., 200° C., 225° C., and finally 250° C. for 1.5-hour increments, before leaving overnight (23 hours total). Liquid and gas phase samples were taken, before cooling to add an additional amount of pine sawdust (3.51, 3.20, 2.99, and 2.95 grams) for 4 additional cycles. Cumulative addition after five cycles corresponded to 21.1 wt % dry solids addition to the final reactor mixture. By staging addition of biomass solids, a moderate viscosity slurry with free liquid was maintained.

Recovery of undigested solids by filtration indicated 94% of the bagasse dry solids had been converted to liquid products and/or solubilized in the reaction mixture. A GC analysis of the both oil and aqueous phases indicated an estimated 11 wt % liquid product formation relative to a maximum expected value of 9.1% basis carbon content of feed charged. Observed liquid products were more volatile than sorbitol, basis GC retention times. The experiment demonstrates an ability to solubilize and reform biomass via direct APR, to obtain concentrations of intermediates in excess of 5 wt %, as required for economic processing in subsequent condensation reactions.

Example 14

A 100-ml batch reactor was charged with 30.182-g of isopropanol (IPA) and 30.069 grams of deionized water. 1.0515 grams of acetic acid were added as simulated recycle hydrolysis catalyst. 1.0505 grams of 5% Pt/C APR catalyst (50% wet) were also charged. 3.53 grams of Loblolly pine (<30 mesh, 18% moisture) were charged for an initial cycle, along with 87 kPa of $H_2$. The reactor was heated with mixing to 175° C., 200° C., 225° C., and finally 250° C. for 1.5-hour increments, before leaving overnight (23 hours total). Liquid and gas phase samples were taken, before cooling to add an additional amount of pine sawdust (3.47, 3.48, 3.50, and 3.51 grams) for each of 4 additional cycles. Cumulative addition after five cycles corresponded to 22.9 wt % dry solids addition to the final reactor mixture. By staging addition of biomass solids, a moderate viscosity slurry with free liquid was maintained.

Recovery of undigested solids by filtration indicated 78% of the pine dry solids had been converted to liquid products. A GC analysis of the liquid phase verified 5.9 wt % of liquid products formed with retention times less than sorbitol, relative to a maximum 7.6 wt % possible from carbon present in feed, at this conversion. These results show an ability to hydrolyze and reform softwood (pine) to liquid fuels (oxygenates), to obtain a concentration of greater than 5 weight percent, as desired for separation and use as a fuel additive, or for economic further processing via condensation to liquid fuels.

Examples 15-17

Basic copper-magnesium-cerium oxide catalysts were prepared by co-precipitation of metal nitrate solutions via KOH and potassium carbonate, as described by M. Gines and E. Iglesia [J. Catalysis 1998, 176 (155-172)].

Magnesia-zirconia (MgO—$ZrO_2$) catalyst was synthesized using the sol-gel technique starting with magnesium nitrate {Mg($NO_3$)2.6$H_2O$} and zirconyl nitrate {ZrO($NO_3$)$_2$}. The catalyst was prepared by dissolving 50.9 g of magnesium nitrate and 4.04 g of zirconyl nitrate in 1 liter of deionized (DI) water. The mixture was stirred at room temperature, and NaOH (25 wt %) solution was added until the pH was equal to 10. The gel was aged for 72 h and subsequently vacuum filtered. The precipitate formed was washed with DI water until the Na ion concentration in the filtrate was below 10 ppm, as measured by Inductively Coupled Plasma (ICP) analysis [Perkin Elmer Plasma 400 ICP Emission Spectrometer]. It was then dried in an oven at 120° C. from 16 to 24 h. Calcination of the catalyst was carried out in $O_2$ (~100 cm3(NTP)min-1) with a 3 h ramp and a 3 h hold to 600° C.

For some experiments, Pd was added to give a 1 wt % Pd/MgO—$ZrO_2$ catalyst, using incipient wetness impregnation of a solution of 5 wt % Pd in tetraaminepalladium (II) nitrate solution.

Mixed Mg—Al-oxide hydrotalcite catalysts of variable Mg/Al atomic ratio of about 1:2 was prepared by adding Mg($NO_3$).26$H_2O$ and Al($NO_3$).39$H_2O$ (0.093 mol) to $H_2O$. A second solution containing NaOH (4 parts) and $Na_2CO_3$ (1 part) in excess $H_2O$ was slowly added to the Mg/Al aqueous solution with constant stirring over a period of 3 h. The pH of the solution was maintained at 11.0 by adding additional NaOH solution (25 wt %) when required. This solution was then heated to 65° C. for 18 h. A precipitate formed, which was subsequently filtered and washed with de-ionized water until the sodium (Na) content of the filtrate was below 10 ppm as measured by ICP analysis. The precipitate was dried in an oven at 80° C. for 12 h to obtain the hydrotalcite. Calcination of the hydrotalcite was carried out in flowing $O_2$ (GHSV 400 h/1), during which the temperature was ramped from room temperature to 450° C. over 2 h and then held at 450° C. for 8 h. The mixed Mg—Al-oxide catalyst thus prepared was used to carry out aldol-condensation reactions.

Example 18

A flow reactor was packed with 0.609 grams of a CuMg-$CeO_2$ and 0.618 grams of a Mg/$ZrO_2$ catalyst. A model feed of isopropyl alcohol (2-propanol) was introduced at a flow-rate of 1.20 grams/per hour, corresponding to a weight hourly space velocity of 0.98/hour. Gas chromatographic analysis was conducted via dual 60-m DB-5 (5% diphenyl-dimethylpolysiloxane) and DB-1701 (14% cyanopropylphenyl-methylpolysilozane) columns. Normal-alkane standards were injected to characterize retention times. Products formed via reaction were characterized by retention times for the corresponding ranges of alkane standards, as described by Kovats (1958).

At a reaction temperature of 400° C. and a pressure of 600 kPa of nitrogen, conversion of 2-propanol was estimated as 84%. Selectivities to components eluting in retention time ranges mapped by normal alkanes are shown in Table 4. Area % is shown for both the lower layer (LL) and the upper layer (UL) for retention times within indicated carbon number C(n) range for 8 normal alkanes. Light components eluting prior to 2-propanol corresponded to <C6 carbon number. Heavier components eluting after unconverted 2-propanol were grouped into alkane-equivalent retention time ranges corresponding to C6-C9, C9-C12, C12-C15, and C15+ regions. This example demonstrates the ability of the catalyst combination, which includes copper component to effect dehydration of alcohols to carbonyl intermediates (ketones and aldehydes), and the ability of the base catalyst to "condense" these intermediates to higher molecular weight, lower volatility components exhibiting a retention time substantially greater than the original 2-propanol feed. A non-water miscible oil phase was formed, along with a lower layer of water condensation product, unconverted isopropanol, and other heavy components.

TABLE 4

Flow reaction of aldol condensation of model APR product

| LL | UL | C(n) |
|---|---|---|
| 24.0% | 26.3% | <C6 |
| 38.7% | 30.7% | C6-C9 |
| 21.9% | 26.6% | C9-12 |
| 10.3% | 12.3% | C12-15 |
| 5.1% | 4.1% | C15+ |

Example 19

A flow reactor was packed with 0.931 grams of 1% Pd/Mg$ZrO_2$ catalyst. 50% acetone in deionized water was fed at WHSV=1.28, 375° C. and 1365 kPa $H_2$ pressure. Acetone conversion was estimated as 49%, with selectivity to components with GC retention times comparable to n-alkanes in upper and lower aqueous layers as shown in Table 5. The upper layer (UL) and lower layer aqueous (LL) area percent for retention times relative to n-alkane standards are shown.

TABLE 5

Flow reaction with base catalyst and model APR product as feed.

| UL | LL | Acetone |
|---|---|---|
| 1.0% | 0.5% | <C6 |
| 52.6% | 86.6% | C6-C9 |
| 25.9% | 10.8% | C9-C12 |
| 10.6% | 1.7% | C12-C15 |
| 9.9% | 0.5% | C15+ |

Principal product formed was identified as 4-methyl-2-pentanone, via aldol condensation, dehydration, and hydrogenation. This result demonstrates an ability to conduct aldol condensation to yield aldol and other products despite the presence of water from APR reaction.

Example 20

60.1 grams of a mixture of 16.5 wt % acetone in deionized water were charged to a stirred batch reactor, with 1.007 grams of a copper chromite catalyst and 0.9972 gram of calcium hydroxide. Nitrogen at 3,720 kPa was charged to the reactor heated to 260° C. for 17 hours. Resulting GC analysis showed 12.0% conversion to the aldol condensation product 4-hydroxy-4-methyl-2-pentanone (di-acetone alcohol), 0.28% conversion to 4-methyl-2-pentanone, and 4.5% conversion to longer retention time, higher molecular weight oligomers. This example demonstrates the ability to conduct aldol condensation using calcium hydroxide catalyst under aqueous phase reforming conditions, despite the presence of excess liquid-phase water.

Example 21

A model aqueous phase reforming reaction (APR) was conducted with 60.1 grams of 25% sorbitol in deionized water, with 1.0466 g of 5% Pt/C catalyst and 4235 kPa hydrogen. The reaction was heated to 250° C. for 17.5 hours before sampling for GC analysis.

The filtered reactor contents were then subjected to dehydrogenation and aldol condensation using 1.36 grams of nickel sponge metal catalyst (A7000, a Raney-type catalyst available from Activated Metals of Sevierville, Tenn.) and 1.038 grams of calcium hydroxide. Reactor contents were heated under 3700 kPa of nitrogen, to 250° C. for 21.5 hours. Results of GC analyses are shown in Table 6 below. The dehydrogenation and aldol condensation step was found to shift the product distribution to longer retention time, higher molecular weight species, as mapped by the retention times of corresponding n-alkanes. This experiment demonstrates the use of a dehydrogenation co-catalyst, to produce active carbonyls for aldol condensation.

TABLE 6

Liquid phase aldol condensation with calcium hydroxide for model APR feed.

| Dehydro condense wt % | APR Product wt % | C(n) |
|---|---|---|
| 0.322 | 1.192 | <C6 |
| 2.103 | 3.222 | C6-C9 |
| 2.682 | 1.440 | C9-C12 |
| 1.800 | 0.673 | C12-C15 |
| 0.715 | 0.662 | C15+ |
| 7.621 | 7.189 | Total |

Example 22

A catalytic pulse microreactor was packed with 0.05 grams of 1% Pd/hydrotalcite catalyst prepared as per Example 17. The catalyst was reduced under $H_2$ at 375° C., before switching to helium carrier gas for injection of 1 microliter pulses of an IPA-Acetone-THF-Acetic Acid-deionized water model feed at a ratio of 10:10:3:3:74 by weight. Results showed 69% conversion via aldol condensation and/or ketonization for the vapor phase reaction, despite the presence of water in the model feed. Selectivity to higher molecular weight products is shown in Table 7, as characterized by the retention time of the corresponding n-alkane standards.

TABLE 7

Pulse Microreactor Condensation of model feed over hydrotalcite

| Area % | C(n) |
|---|---|
| 12.2 | <C6 |
| 22.7 | C6-C9 |
| 9.0 | C9-C12 |
| 45.6 | C12-C15 |
| 10.1 | C15+ |

Separate component injections with mass spec analysis confirmed dimerization of acetone to C6 products, dimerization of methylisobutyl ketone to C12, 2-pentanone dimerization of C12, and 2-butanone dimerization to C8.

Example 23

A catalytic pulse microreactor was packed with 0.05 grams of 1% Pd/Mg—$ZrO_2$ catalyst prepared as per Example 16. The catalyst was reduced under $H_2$ at 375° C., followed by injection under hydrogen carrier gas of 1 micro-liter pulses of a model feed of IPA-Acetone-THF-AceticAcid-Deionized water at a ratio of 10:10:3:3:74 by weight. Selectivity to higher molecular weight products is shown in Table 8, as characterized by the retention time of the corresponding n-alkane standards. Results show the combination of dehydrogenation, cyclic ether ring opening, aldol condensation and/or ketonization for the vapor phase reaction, despite the presence of water in the model feed.

TABLE 8

Pulse Microreactor Condensation of model feed over Mg—$ZrO_2$

| Area % | C(n) |
|---|---|
| 19.2 | <C6 |
| 63.3 | C6-C9 |
| 8.2 | C9-C12 |
| 5.4 | C12-C15 |
| 0.7 | C15+ |

Example 24

Liquid samples from direct biomass APR with bagass as feed (Example 13) were injected into a pulse microreactor containing 0.05 grams of a hydrotalcite catalyst prepared as described in Example 17, and held at 375° C. under helium carrier gas. Resulting products showed a shift to higher molecular weight species, with retention times relative to n-alkane standards as reported in Table 9.

TABLE 9

375° C. Hydrotalcite Condensation of Direct Bagasse APR product.

| Area % | C(n) |
|---|---|
| 22.8% | <C6 |
| 48.3% | C6-C9 |
| 24.3% | C9-C12 |
| 3.6% | C12-C15 |
| 1.0% | C15+ |

The invention is seen to be well adapted to attain the ends and advantages mentioned as well as those that are inherent therein. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a bio-based feedstock comprising lignin;
   contacting the bio-based feedstock with a solvent in a hydrolysis reaction to form an intermediate product comprising carbohydrates wherein the bio-based feedstock is contacted with a hydrolysis catalyst selected from the group consisting of: an organic acid catalyst, a base catalyst, a metal catalyst, acetic acid, formic acid, levulinic acid, and any combination thereof;
   contacting the intermediate product with an aqueous phase reforming catalyst to form a plurality of oxygenated intermediates, wherein the hydrolysis reaction and aqueous phase reforming reaction take place in the same vessel;
   providing a first portion of the oxygenated intermediates as at least part of the solvent; and
   contacting at least a second portion of the oxygenated intermediates with a condensation catalyst comprising a base functionality to form a fuel blend.

2. The method of claim 1 wherein the oxygenated intermediates comprise a carbonyl-containing compound.

3. The method of claim 2 further comprising contacting the second portion of the oxygenated intermediates with a dehydrogenation catalyst to increase the amount of carbonyl-containing compounds in the second portion of the oxygenated intermediates.

4. The method of claim 1 wherein the condensation catalyst further comprises an acidic functionality.

5. The method of claim 1 further comprising contacting the second portion of the oxygenated intermediates with a catalyst comprising an acidic functionality to effect a ring opening reaction.

6. The method of claim 1 further comprising contacting the second portion of the oxygenated intermediates with a catalyst comprising a base functionality to effect a ketonization reaction.

7. The method of claim 1 further comprising contacting the second portion of the oxygenated intermediates with a hydrogenation catalyst to form the fuel blend after contacting the second portion of the oxygenated intermediates with the catalyst comprising the base functionality.

8. The method of claim 1 wherein the aqueous phase reforming catalyst and the catalyst comprising the base functionality are in the same vessel.

9. The method of claim 1 wherein the fuel blend comprises a diesel fuel.

10. The method of claim 1 wherein the fuel blend comprises a jet fuel.

11. The method of claim 1 wherein the intermediate product has a carbohydrate content of less than 5% at the outlet of the hydrolysis reaction.

12. The method of claim 1 wherein the intermediate product has a total organic content on a weight basis, and wherein the total organic content of the intermediate product is greater than 2%.

13. The method of claim 1 wherein the metal catalyst and the aqueous phase reforming catalyst is the same catalyst.

14. A method comprising:
   providing a bio-based feedstock comprising lignin;
   contacting the bio-based feedstock comprising lignin with a solvent to form an intermediate product comprising carbohydrates wherein the bio-based feedstock is contacted with a hydrolysis catalyst selected from the group consisting of: an organic acid catalyst, a base catalyst, a metal catalyst, acetic acid, formic acid, levulinic acid, and any combination thereof;
   contacting at least a portion of the intermediate product with a hydrogenolysis catalyst in the presence of a first hydrogen source to form at least some hydrogenolysis reaction products;
   contacting at least a portion of the intermediate product with a hydrogenation catalyst in the presence of a second hydrogen source to form at least some hydrogenation reaction products;
   contacting at least a portion of the intermediate product with an aqueous phase reforming catalyst to form an aqueous phase reforming reaction product;
   wherein at least a portion of the hydrogenolysis reaction products, at least a portion of the hydrogenation reaction products, and at a least a portion of the aqueous phase reforming reaction products are combined to form a plurality of oxygenated intermediates, wherein a first portion of the oxygenated intermediates are recycled to form the solvent and wherein the hydrolysis reaction and at least one of the hydrogenolysis reaction, hydrogenation reaction, and aqueous phase reforming reaction take place in the same vessel; and
   contacting at least a second portion of the oxygenated intermediates with a condensation catalyst comprising a base functionality to form a fuel blend.

15. The method of claim 14 wherein the aqueous phase reforming reaction products comprise hydrogen, and wherein the hydrogen is the first hydrogen source, the second hydrogen source, or both.

16. The method of claim 14 wherein the hydrogenolysis catalyst, the hydrogenation catalyst, and the aqueous phase reforming catalyst are the same catalyst.

17. The method of claim 14 wherein the hydrogenolysis catalyst, the hydrogenation catalyst, and the aqueous phase reforming catalyst are present in the same reactor vessel.

18. The method of claim 14 further comprising contacting the second portion of the oxygenated intermediates with a dehydrogenation catalyst to increase the amount of carbonyl-containing compounds in the second portion of the oxygenated intermediates.

19. The method of claim 14 further comprising contacting the second portion of the oxygenated intermediates with a hydrogenation catalyst to form the fuel blend after contacting the second portion of the oxygenated intermediates with the catalyst comprising the base functionality.

20. The method of claim 14 wherein the metal catalyst and the aqueous phase reforming catalyst is the same catalyst.

21. A method comprising:
providing a bio-based feedstock comprising lignin;
contacting the bio-based feedstock comprising lignin with an aqueous phase reforming catalyst in a vessel to form a plurality of oxygenated intermediates;
contacting the bio-based feedstock comprising lignin with a solvent in a hydrolysis reaction wherein the bio-based feedstock is contacted with a hydrolysis catalyst comprising at least one catalyst selected from the group consisting of: an organic acid catalyst, a base catalyst, a metal catalyst, acetic acid, formic acid, levulinic acid, and any combination thereof, wherein the hydrolysis catalyst and aqueous phase reforming catalyst are in the same vessel and
contacting at least a portion of the oxygenated intermediates with a condensation catalyst comprising a base functionality to form a fuel blend.

22. The method of claim 21 wherein the bio-based feedstock comprising lignin comprises a solids feedstock.

23. The method of claim 22 further comprising:
recovering at least a portion of a reaction product from the reactor containing the solvent and aqueous phase reforming catalyst; and
providing at least a portion of the recovered reaction product as at least part of the solvent in the hydrolysis reaction.

24. The method of claim 21 wherein the metal catalyst and the aqueous phase reforming catalyst is the same catalyst.

* * * * *